United States Patent
Otani et al.

(10) Patent No.: US 6,788,410 B1
(45) Date of Patent: Sep. 7, 2004

(54) DELAY TIME MEASUREMENT APPARATUS FOR OPTICAL ELEMENT

(75) Inventors: Akihito Otani, Atsugi (JP); Toshinobu Otsubo, Atsugi (JP)

(73) Assignee: Anritsu Corporation, Tokyo (JP)

( * ) Notice: Subject to any disclaimer, the term of this patent is extended or adjusted under 35 U.S.C. 154(b) by 0 days.

(21) Appl. No.: 09/460,864

(22) Filed: Dec. 14, 1999

(30) Foreign Application Priority Data

Dec. 24, 1998 (JP) .......................................... 10-366859

(51) Int. Cl.[7] .............................................. G01J 4/04
(52) U.S. Cl. ..................................... 356/364; 356/73.1
(58) Field of Search ............................... 356/73.1, 497, 356/477, 364, 365–368, 450, 491

(56) References Cited

U.S. PATENT DOCUMENTS

| | | | |
|---|---|---|---|
| 4,632,556 A | | 12/1986 | Akatsu |
| 5,247,382 A | | 9/1993 | Suzuki |
| 5,661,711 A | | 8/1997 | Tanaka et al. |
| 5,995,228 A | * | 11/1999 | Otani et al. .................. 356/364 |
| 6,057,919 A | * | 5/2000 | Machida et al. ............. 356/450 |

FOREIGN PATENT DOCUMENTS

| | | |
|---|---|---|
| EP | 321 252 A2 | 6/1989 |
| EP | 588 301 A2 | 3/1994 |
| EP | 937 973 A2 | 8/1999 |
| JP | 4-177141 | 6/1992 |
| JP | 6-174592 | 6/1994 |

* cited by examiner

Primary Examiner—Frank G. Font
Assistant Examiner—Andrew H. Lee
(74) Attorney, Agent, or Firm—Frishauf, Holtz, Goodman & Chick, P.C.

(57) ABSTRACT

A delay time measurement apparatus for an optical element includes a pulse light source, wavelength setting unit, optical power divider, optical delay unit, controller, and detector. The pulse light source can vary the wavelength of light to be output, and outputs an optical pulse having a predetermined repetition period. The wavelength setting unit sets the wavelength of light to be output from the pulse light source. The optical power divider divides the optical pulse output from the pulse light source into a first optical pulse and a second optical pulse to be input to an optical element as the object to be measured. The optical delay unit can vary the spatial optical path length along which the first optical pulse divided by the optical power divider travels. The controller changes the spatial optical path length of the optical delay unit. The detector receives a measurement optical pulse output from the optical element as the object to be measured, and a reference optical pulse output from the optical delay unit, and detects the delay time of light that has passed through the optical element as the object to be measured from a change in spatial optical path length required for superposing the measurement and reference optical pulses on each other.

11 Claims, 12 Drawing Sheets

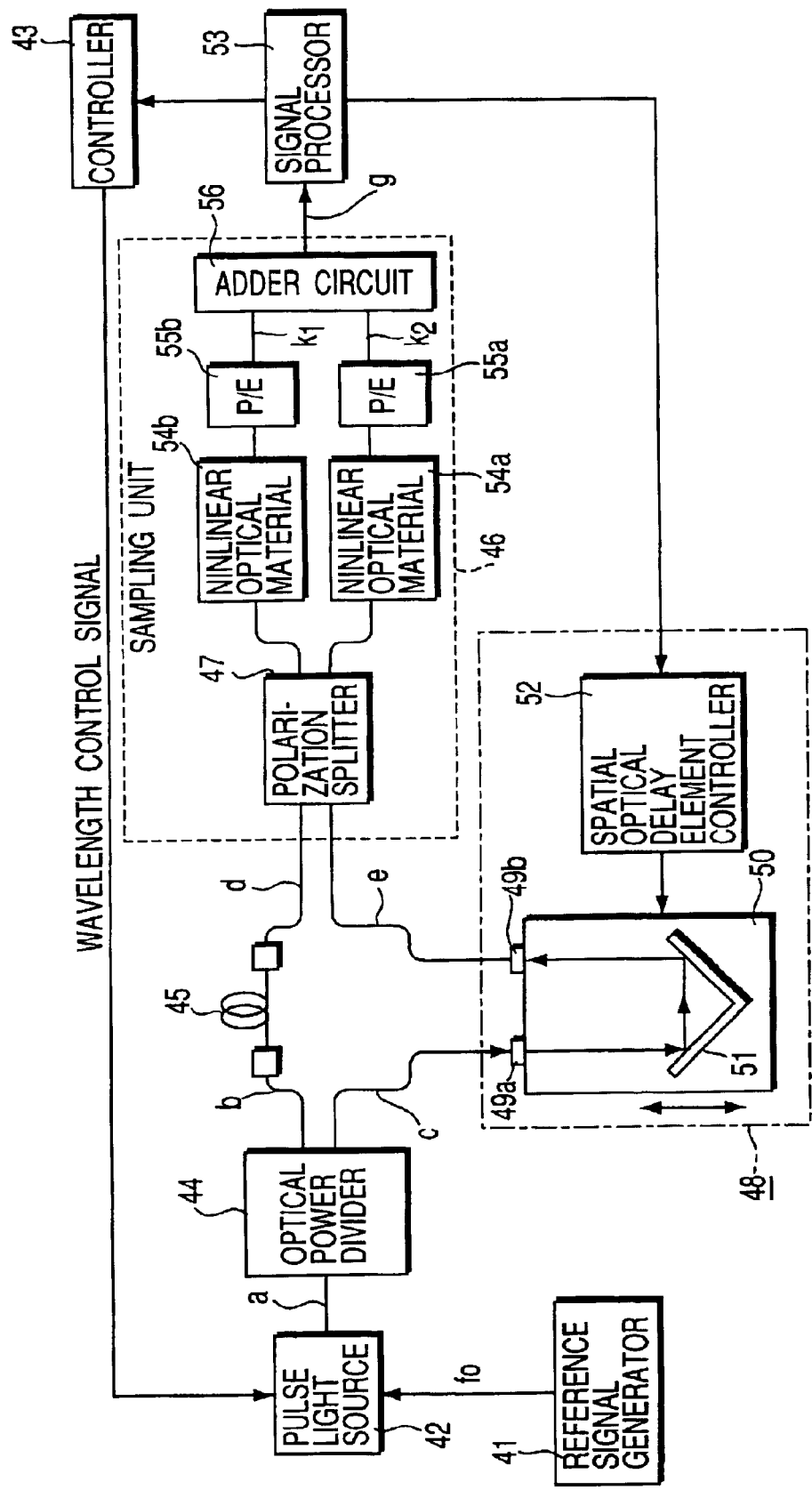
F I G. 1

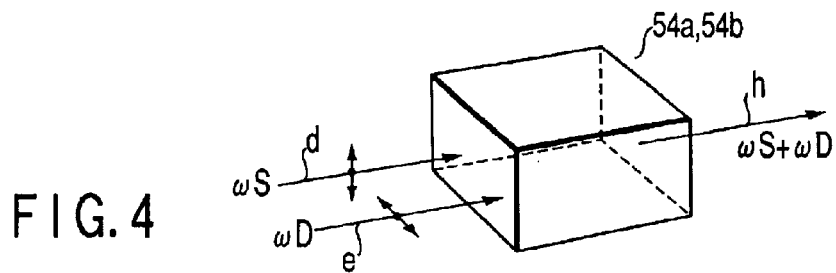
FIG. 4
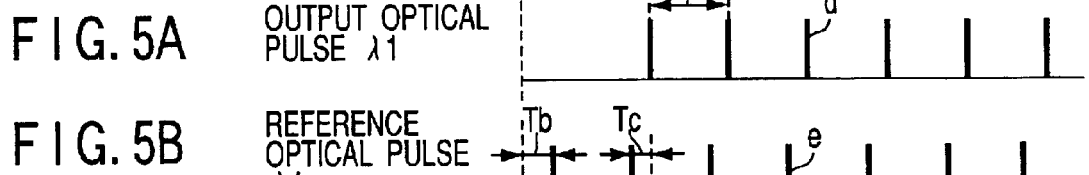
FIG. 5A  OUTPUT OPTICAL PULSE λ1
FIG. 5B  REFERENCE OPTICAL PULSE λ1
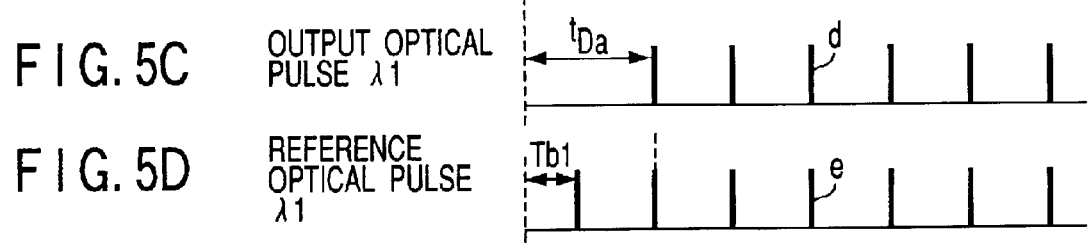
FIG. 5C  OUTPUT OPTICAL PULSE λ1
FIG. 5D  REFERENCE OPTICAL PULSE λ1
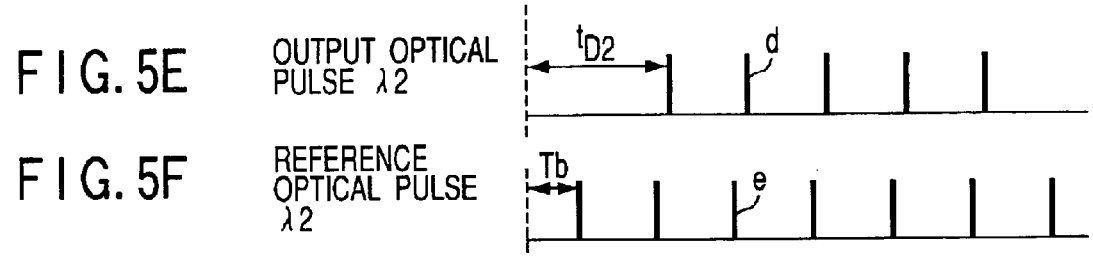
FIG. 5E  OUTPUT OPTICAL PULSE λ2
FIG. 5F  REFERENCE OPTICAL PULSE λ2
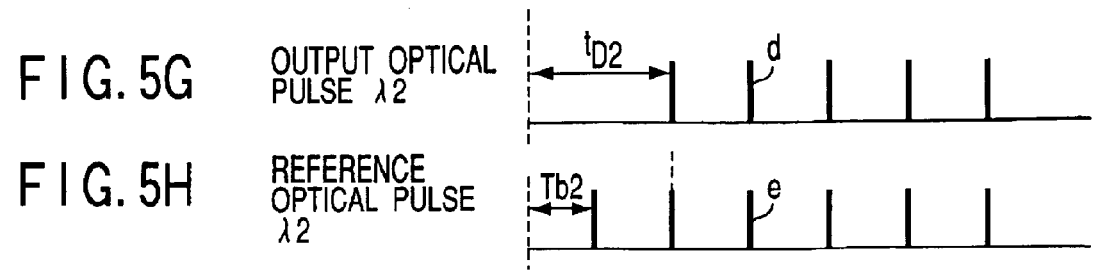
FIG. 5G  OUTPUT OPTICAL PULSE λ2
FIG. 5H  REFERENCE OPTICAL PULSE λ2

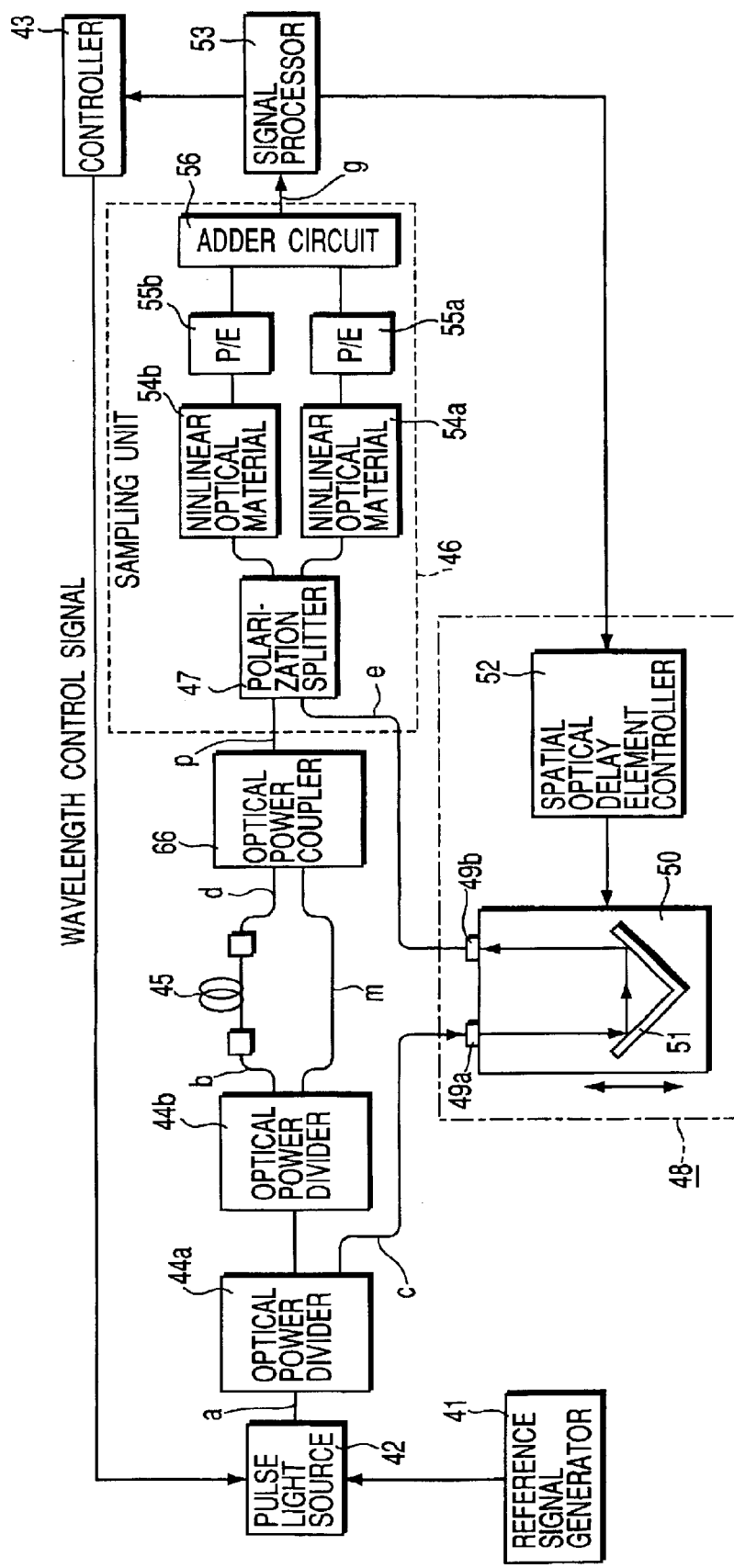
F I G. 8

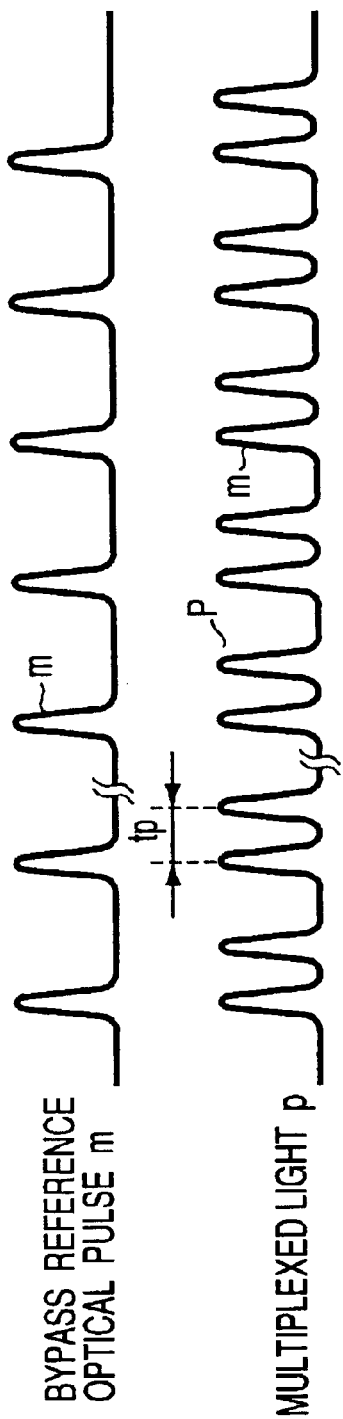
F I G. 9A  OUTPUT OPTICAL PULSE d
F I G. 9B  BYPASS REFERENCE OPTICAL PULSE m
F I G. 9C  MULTIPLEXED LIGHT p
F I G. 9D  REFERENCE OPTICAL PULSE e
F I G. 9E  AUTOCORRELATION INTENSITY SIGNAL g

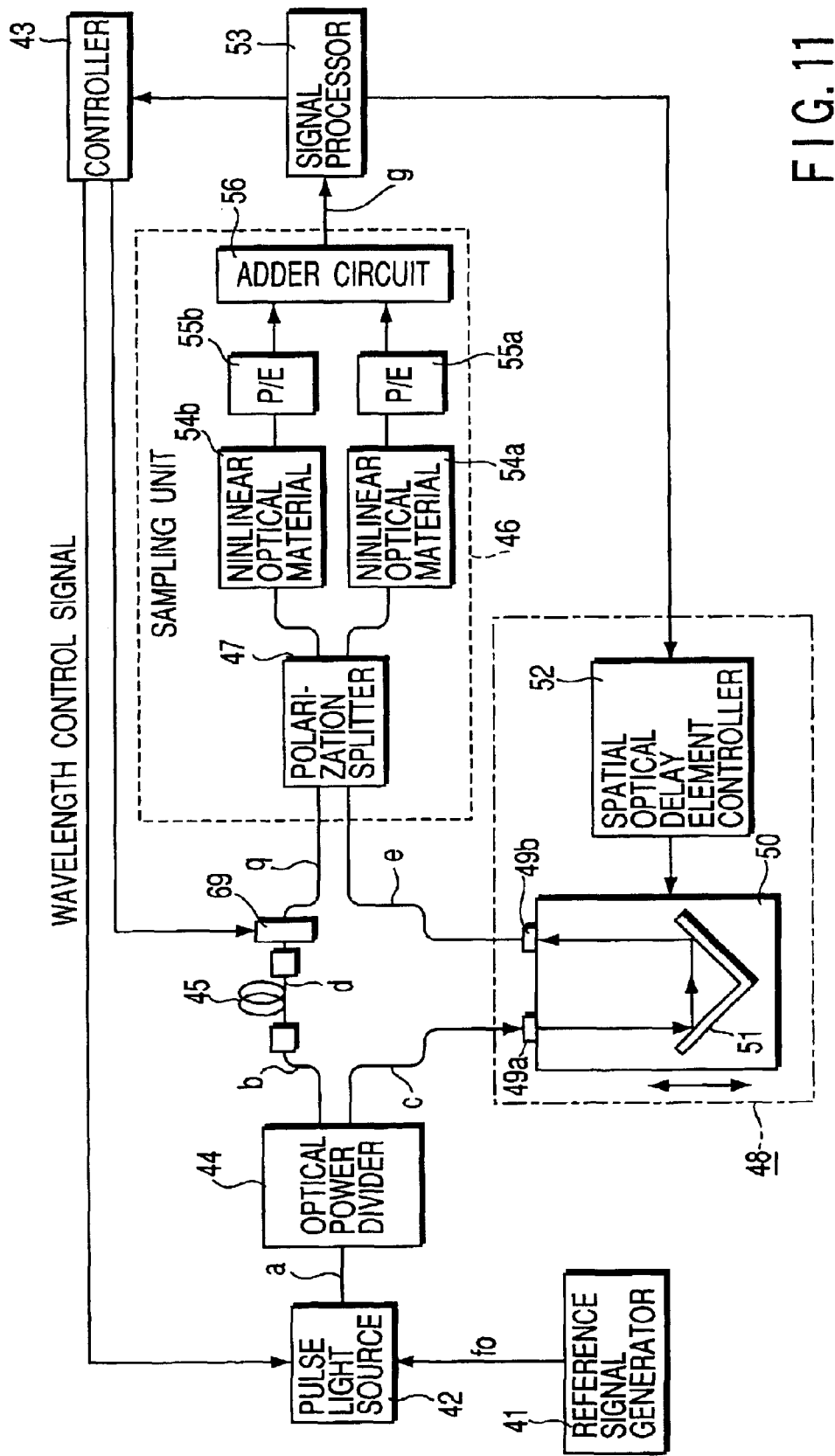
F I G. 11

FIG. 16 PRIOR ART
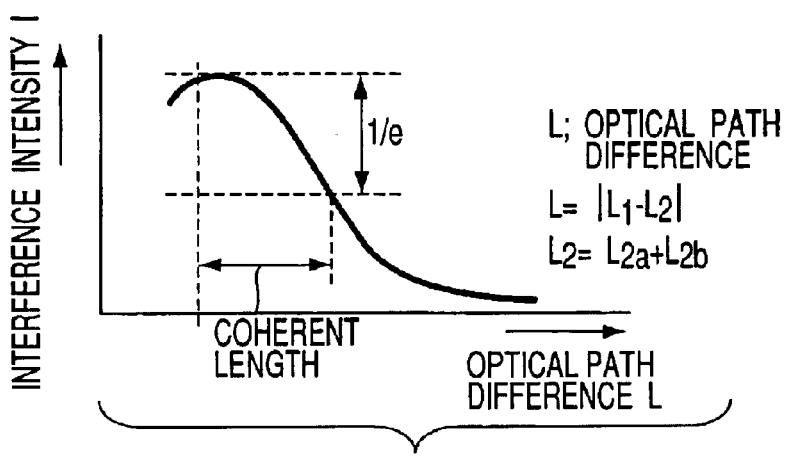
FIG. 17 PRIOR ART
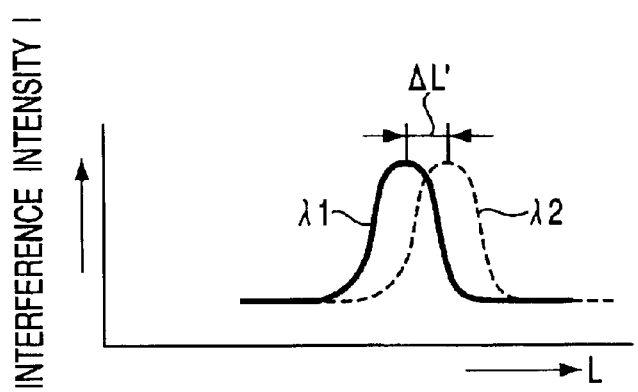
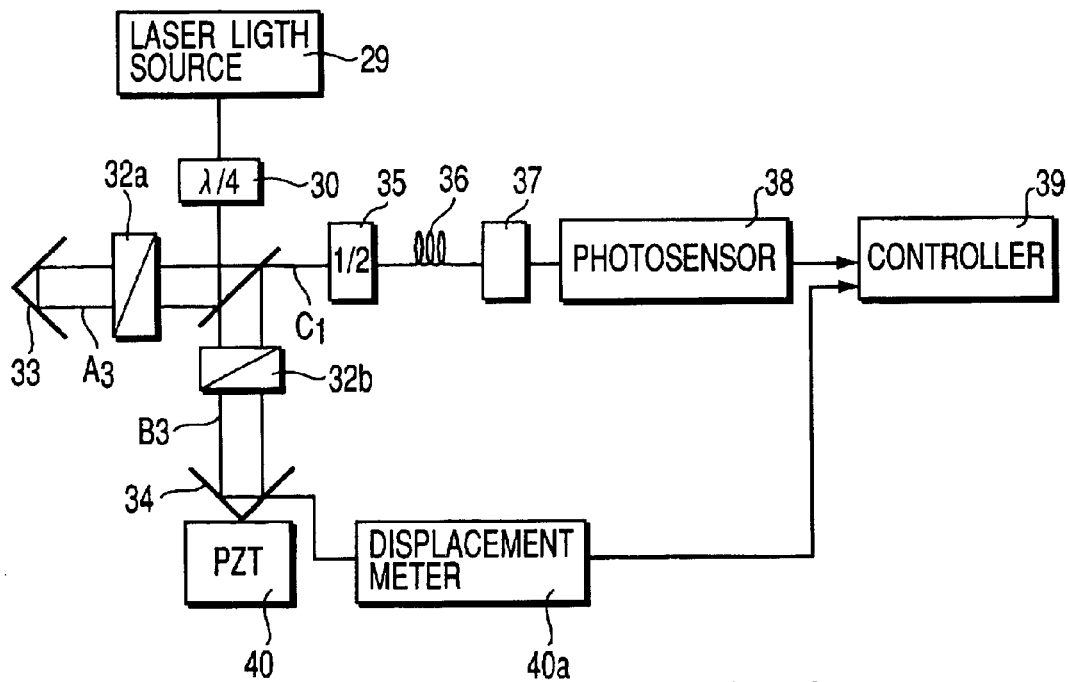
FIG. 18 PRIOR ART

DELAY TIME MEASUREMENT APPARATUS FOR OPTICAL ELEMENT

BACKGROUND OF THE INVENTION

The present invention relates to a delay time measurement apparatus for an optical element and, more particularly, to a delay time measurement apparatus for an optical element, which includes a wavelength dispersion measurement apparatus for measuring wavelength dispersion that occurs when light passes through an object to be measured such as an optical fiber or the like, and a polarization dispersion measurement apparatus for measuring polarization dispersion that occurs when light passes through the object to be measured.

As is well known, the velocity at which an optical signal propagates in an optical element, for example, an optical fiber, varies depending on the wavelength of the optical signal.

Hence, the pulse width (time duration) of a pulse waveform in an optical pulse signal output from a light source having a wavelength spread is broadened in the optical fiber.

Since the propagation frequency band of the optical fiber is inversely proportional to the pulse width, it finally influences the limitation on the propagation velocity of an optical signal.

Hence, the measurement of the propagation velocity (wavelength dispersion) in the optical fiber in units of wavelengths is a very important test item for the optical fiber.

Especially, since an ultra-fast optical signal beyond 100 Gbits/s, which will be used in the next generation large-capacity optical network, has a pulse width as narrow as several ps (pico seconds), and a large wavelength spread, wavelength dispersion of the optical fiber considerably influences optical transmission.

In a pulse generation technique as well, the generation ratio of high-quality pulses, i.e., transform-limited optical pulses largely depends on the wavelength dispersion of the optical fiber and, hence, wavelength dispersion measurement becomes a more important item.

AS the wavelength dispersion measurement methods, (a) time-resolved spectrometry, (b) a pulse method, (c) an interference method, (d) a difference method, (e) a phase difference method, and the like have been proposed.

Of these methods (a) to (e), the pulse method (b) and interference method (c), which are relatively frequently implemented, will be explained below.

The pulse method proposed by Jpn. Pat. Appln. ROKAI No. 6-174592 will be explained first using FIG. 12.

As shown in FIG. 12, white pulses which are output from a white pulse light source 1 and have a broad wavelength range are wavelength-limited to a specific wavelength by a tunable optical bandpass filter 2, and are divided into an input optical pulse 4 and reference optical pulse 5 by an optical power divider 3.

The input optical pulse 4 enters one end of an optical power coupler 7 via a fiber 6 to be measured.

On the other hand, the reference optical pulse 5 directly enters the other end of the optical power coupler 7.

The optical power coupler 7 outputs a combined optical signal 8 obtained by combining the input optical pulse 4 and reference optical pulse 5 to a delay time detection means 9.

The delay time detection means 9 calculates a delay time $t_D$ of the input optical pulse 4 with respect to the reference optical pulse 5 on the basis of the combined optical signal 8.

More specifically, since the input optical pulse 4 is delayed when it has passed through the fiber 6 to be measured, two peaks form in the signal waveform of the combined optical signal 8 upon combining the input optical pulse 4 and the reference optical pulse 5 free from any time delay.

The time difference between these two peaks is the delay time $t_D$ detected by the delay time detection means 9.

By changing a wavelength λ of the tunable optical bandpass filter 2, the delay time detection means 9 can calculate delay times $t_D(λ)$ at individual wavelengths λ.

The wavelength dependence of these delay times $t_D(λ)$ defines wavelength dispersion characteristics.

The pulse method proposed by Jpn. Pat. Appln. KOKAI No. 4-177141 will be explained below using FIG. 13.

As shown in FIG. 13, optical pulses output from an ultra short pulse generation device 11 pass through an optical fiber 12 to be measured, and are then divided into two optical pulses A and B by an optical power divider 13.

Only a specific wavelength component of one optical pulse A passes through a tunable bandpass filter 14 as a first optical pulse.

On the other hand, the other optical pulse B passes through a delay line 15 as a second optical pulse.

These first and second optical pulses are combined by an optical power coupler 16, and the combined pulse is converted into an electrical signal by a photosensor 17.

The electrical signal is input to a pulse waveform observation device 18 to measure the relative delay time difference between the first and second optical pulses as a function of the wavelength, thus obtaining the aforementioned wavelength dependence of the delay time.

A wavelength dispersion measurement apparatus which uses the interference method (c) and is specified by JIS c6827, as shown in FIG. 14, is known as an apparatus that implements wavelength dispersion measurement with high precision.

As shown in FIG. 14, white light which is output from a white light source 20 and has a broad wavelength range is input to a spectroscope 21 having predetermined spectrum characteristics to extract the component of a specific wavelength $λ_C$.

The spectrum characteristics of the spectroscope 21 have a predetermined wavelength spread having a center wavelength $λ_C$, as shown in FIG. 15.

In the spectrum characteristics of this spectroscope 21, the width 1/e (e: base of natural logarithm) below the peak value is called a half-width.

In this case, the half-width is set to fall within the range from 2 to 10 nm.

Light output from the spectroscope 21 is split into input light $A_1$ and reference light $B_1$ by a beam splitter 22.

This input light $A_1$ enters an object 23 to be measured such as an optical fiber or the like.

The input light $A_1$ via the object 23 to be measured is launched into one end of a optical power coupler 26 comprising a half mirror as output light $A_2$.

On the other hand, the reference light $B_1$ is delayed a predetermined period by an optical path delay element 24, and then passes through a variable optical delay device 25 comprising a corner cube mirror, which is controlled to move in the direction in which light travels. The light output from the delay device 25 is launched into the other end of the optical power coupler 26 as reference light $B_2$.

The optical power coupler 26 outputs combined light C obtained by combining the output light $A_2$ and reference light $B_2$ to a photosensor 27.

Note that a lock-in amplifier 28 is provided to amplify with high S/N only a signal output from the photosensor 27, which is synchronized with an optical chopper incorporated in the spectroscope 21.

In this case, if the output light $A_2$ and reference light $B_2$ have an equal optical path length, the light intensity of the combined light C, i.e., an interference intensity I, increases, and a large signal is output from the photosensor 27.

Therefore, the delay amount in the variable optical delay device 25 is adjusted to maximize the signal output from the photosensor 27, i.e., to match the optical path lengths of the output light $A_2$ and reference light $B_2$.

In this case, the delay amount of the reference light $B_2$ from the reference light $B_1$, i.e., the input light $A_1$ in the optical path delay element 24 and variable optical delay device 25 is known.

Hence, the delay amount of the reference light $B_1$ at that time is that of the output light $A_2$, and the delay time of the object 23 to be measured can be measured from this delay amount.

FIG. 16 is a graph showing the relationship between the interference intensity I between the output light $A_2$ and reference light $B_2$, and an optical path difference L ($=|L_1-L_2|$) between the output light $A_2$ and reference light $B_2$.

Note that the optical path $L_2$ of the reference light $B_2$ is a total of an optical path $L_{2a}$ of the optical path delay element 24 and an optical path $L_{2b}$ of the variable optical delay device 25.

In this manner, the delay time of the object 23 to be measured can be obtained from the maximum optical path difference L of the interference intensity I, which is obtained by changing the optical path difference L in turn.

FIG. 17 is a graph showing a shift of the peak position of the interference intensity I when the center wavelength $\lambda_C$ of the reference light $B_1$ extracted by the spectroscope 21 is changed from $\lambda_1$ to $\lambda_2$.

A wavelength dispersion value can be obtained from a time corresponding to this shift amount ΔL'0 of the peak position.

The aforementioned variable optical delay device 25 comprising a corner cube mirror can control the delay amount on the 1-µm order (about 0.003 ps in time) by an external control signal.

Therefore, the wavelength dispersion measurement apparatus, which uses the interference method (c) and is specified by JIS c6827, as shown in FIG. 14, can measure the delay time with higher precision compared to the pulse method (b) and, for example, the wavelength dispersion of a low-dispersion object to be measured such as an optical fiber as short as several meters or the like can be measured.

As another important characteristic of an optical communication medium such as an optical fiber or the like, polarization dispersion characteristics are known.

More specifically, in an optical fiber which has an ideal circular section, an optical pulse signal that travels through this optical fiber does not suffer any propagation velocity difference independently of its direction in the sectional shape.

However, if an optical fiber does not have a circular but an elliptic sectional shape, or if an optical fiber is bent and its sectional shape locally has a lower profile, a propagation velocity difference is produced depending on the directions of polarization.

Hence, the measurement of the velocity differences of an optical signal that travels through the optical fiber in the respective directions of polarization, i.e., the propagation velocities (polarization dispersions) in the optical fiber in units of directions of polarization, is also a very important performance test item for the optical fiber.

FIG. 18 is a schematic block diagram showing the arrangement of a conventional polarization measurement apparatus using the interference method.

As shown in FIG. 18, a laser beam which is output from a laser source 29 and has a broad spectrum is converted into circularly polarized light by a quarter-wave plate 30, and the circularly polarized light is split into input light $A_3$ and reference light $B_3$ by a beam splitter 31.

These input light $A_3$ and reference light $B_3$ are respectively controlled by polarizers 32a and 32b to be linearly polarized light beams, the directions of polarization of which have a 90° difference therebetween.

The optical path difference between the input light $A_3$ and reference light $B_3$ is set by a fixed optical delay device 33 and variable optical delay device 34.

Combined light $C_1$ of the input light $A_3$ and reference light $B_3$ combined by the beam splitter 31 is input to a half-wave plate 35 so as to maintain orthogonal the directions of polarization of the input light $A_3$ and reference light $B_3$ which form the combined light $C_1$, and is then input to an analyzer 37 via an object 36 to be measured.

This analyzer 37 extracts only a specific polarization component from the combined light $C_1$ of the input light $A_3$ and reference light $B_3$, and outputs the extracted component to a photosensor 38.

The object 36 to be measured receives the combined light $C_1$, in which the directions of polarization of the input light $A_3$ and reference light $B_3$ are maintained to be orthogonal.

Then, the analyzer 37 extracts the specific polarization component including polarization dispersions produced in the object 36 to be measured, and the extracted component is received by the photosensor 38.

At this time, when polarization dispersions having different propagation velocities have occurred in units of directions of polarization in the object 36 to be measured, the photosensor 38 measures the interference intensity between the input light $A_3$ and the reference light $B_3$, which has a direction of polarization perpendicular to that of the input light $A_3$, and is delayed by the variable optical delay device 34.

In this case, a piezoelectric element (PZT) 40 mounted on the variable optical delay device 34 is used to help easily find an interference intensity peak by continuously slightly vibrating variable optical delay device 34.

Also, a displacement meter 40a is used to measure the spatial optical path length of the variable optical delay device 34.

The output from the photosensor 38 and that from the displacement meter 40a are supplied to a controller 39.

With this arrangement, since the photosensor 38 can easily find an interference intensity peak, and the displacement meter 40a can measure the optical path length with high precision, the controller 39 calculates changes in delay amounts in units of directions of polarization of the input light $A_3$ via the object 36 to be measured using the reference light $B_3$ as a reference direction of polarization.

Hence, the photosensor 38 measures the interference intensity between the input light $A_3$ and the reference light $B_3$, which has a direction of polarization perpendicular to that of the input light $A_3$, and is delayed by the variable optical delay device 34.

However, even the aforementioned measurement methods have the following problems to be solved.

The wavelength dispersion measurement method shown in FIG. 13 is not influenced by a change in optical path difference of the optical fiber to be measured due to external factors such as changes in temperature, and the like, since a single optical pulse that has passed through the optical fiber 12 to be measured is divided into two pulses, and the delay times for the components of the respective wavelengths are measured using one of the two divided pulses as reference light on the time axis.

However, since the tunable bandpass filter 14 extracts a specific wavelength from the output light of the ultra-short pulse light source 11, the pulse width (time duration) of the optical pulse that has passed through the tunable bandpass filter 14 inevitably broadens with the existing technique due to limitations on the frequency band.

For this reason, in the wavelength dispersion measurement method shown in FIG. 13, it is difficult to identify the pulse peak position, and many measurement errors may be contained.

For example, if the pass wavelength width is 0.1 nm, the pulse width (time duration) of the extracted optical pulse is assumed to be not less than at least 20 ps (pico seconds).

Also, the wavelength dispersion measurement method shown in FIG. 13 uses the pulse waveform observation device 18 which comprises, e.g., an electric sampling oscilloscope, as a means for measuring the delay time difference.

Therefore, the wavelength dispersion measurement method shown in FIG. 13 is effective for measuring the dispersion of a long optical fiber (several km or more), but is not suitable for measuring low dispersion of an optical fiber as short as about 20 m, which are the typical unit length of an optical fiber (EDF: Erbium Doped Fiber) used in an EDFA (Erbium Doped Fiber amplifier).

On the other hand, the wavelength dispersion measurement method shown in FIG. 12 can implement measurements with higher precision than that shown in FIG. 13, by combining the white pulse light source 1 which outputs a short pulse light group over a continuous, broad wavelength range so as to measure the wavelength dispersion with high precision, and the delay time difference measurement means 9 which comprises, e.g., a streak camera or the like.

Since the spectrum width of the white pulse light source 1 is as broad as 200 nm, a tunable bandpass filter 2 having a bandwidth of around 1 nm can be inserted, and optical pulses having a pulse width (time duration) of several ps can be sufficiently obtained, thus easily identifying the peak position.

However, in the wavelength dispersion measurement method shown in FIG. 12, when a streak camera is used as the delay time difference detection means 9, the precision in the time domain is 0.3 ps or higher, which is insufficient to measure the wavelength dispersion of a low-dispersion object to be measured such as a short optical fiber or the like.

In the wavelength dispersion measurement apparatus using the interference method shown in FIG. 14, since the white light source 20 used as a light source emits continuous light, the strongest interference intensity I is obtained at a position where the difference between the delay amount of the output light $A_2$ produced in the object 23 to be measured, and the sum delay amount of the reference light $B_2$ by the optical delay element 24 and variable optical delay device 25 is "0", i.e., the optical path difference $L=|L_1-L_2|$ therebetween becomes "0".

As described above, since the variable optical delay device 25 comprising a corner cube mirror can control the delay amount on the 1-$\mu$m order, but its delay amount variable range is limited due to dimensional limitations, not so large a delay amount can be set.

Note that the optical delay element 24 may set a fixed delay amount, and this fixed delay amount may be added to the delay amount of the variable optical delay device 25 as a bias delay amount.

However, an optical fiber or the like must be used to set a large delay amount by the optical delay element 24, and it is very difficult for the element 24 to set a large delay amount with high precision like the variable optical delay device 25.

For this reason, since the measurement range is limited within the absolute delay amount given by the optical delay element 24 and variable optical delay device 25, the measurable length range of the object 23 to be measured is around several meters in case of, e.g., an optical fiber, as described in JIS c6827.

Hence, the conventional wavelength dispersion measurement apparatus using the interference method can measure the wavelength dispersion with higher precision than those using other methods, but since the absolute delay amount in the object to be measured poses a problem, it is impossible to measure the wavelength dispersion of an optical fiber having a length of 20 m, 50 m, or the like with high precision.

The same applies to the polarization dispersion measurement apparatus using the pulse method and that using the interference method shown in FIG. 18.

Note that the wavelength and dispersion measurement apparatuses are used to measure and evaluate the delay time of an optical element such as an optical fiber or the like as the object to be measured. Hence, the development of a delay time measurement apparatus for an optical element, including a wavelength dispersion measurement apparatus which can measure the wavelength dispersion of even a long object to be measured with high precision without being influenced by the absolute delay amount produced by the physical length of an optical element such as an optical fiber or the like as the object to be measured, and can measure wavelength dispersion with high precision over a broad length range from several meters to several ten meters, and a polarization dispersion measurement apparatus which can measure the polarization dispersion of a low-dispersion object to be measured with high precision using the same method as that of the wavelength dispersion measurement apparatus, has been strongly demanded.

BRIEF SUMMARY OF THE INVENTION

The present invention has been made in consideration of the aforementioned situation, and has as its object to provide a delay time measurement apparatus for an optical element, including a wavelength dispersion measurement apparatus which can measure the wavelength dispersion of even a long object to be measured with high precision using pulse light as input light to be input to the object to be measured and reference light in place of continuous light without being influenced by the absolute delay amount produced by the physical length of an optical element such as an optical fiber or the like as the object to be measured, and can measure wavelength dispersion with high precision over a broad length range from several meters to several ten meters, and a polarization dispersion measurement apparatus which can measure the polarization dispersion of a low-dispersion object to be measured with high precision using the same method as that of the wavelength dispersion measurement apparatus.

In order to achieve the above object, according to one aspect of the present invention, there is provided a delay time measurement apparatus for an optical element, comprising:

a pulse light source which can vary a wavelength of light to be output, and outputs an optical pulse having a predetermined repetition period;

wavelength setting means for setting a wavelength of light to be output from the pulse light source;

an optical power divider for dividing the optical pulse output from the pulse light source into a first optical pulse and a second optical pulse to be input to an optical element as an object to be measured;

optical delay means capable of changing a spatial optical path length along which the first optical pulse divided by the optical power divider travels;

control means for changing the spatial optical path length of the optical delay means; and detection means for receiving a measurement optical pulse output from the optical element as the object to be measured, and a reference optical pulse output from the optical delay means, and detecting a delay time of light that has passed through the optical element as the object to be measured from a change in spatial optical path length required for superposing the measurement and reference optical pulses on each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic block diagram showing the arrangement of a wavelength dispersion measurement apparatus which is applied as the first embodiment of a delay time measurement apparatus for an optical element according to the present invention;

FIG. 4 is a perspective view for explaining the optical characteristics of a type 2 nonlinear optical material;

FIGS. 5A to 5H are timing charts showing the relationship between output and reference optical pulses in the wavelength dispersion measurement apparatus shown in FIG. 1;

FIG. 8 is a block diagram showing the detailed structure of a sampling unit in a wavelength dispersion measurement apparatus which is applied as the fourth embodiment of a delay time measurement apparatus for an optical element according to the present invention;

FIGS. 9A to 9E are timing charts showing the operation of the wavelength dispersion measurement apparatus applied as the fourth embodiment;

FIG. 11 is a schematic block diagram showing the arrangement of a polarization dispersion measurement apparatus which is applied as the sixth embodiment of a delay time measurement apparatus for an optical element according to the present invention;

FIG. 16 is a graph showing the relationship between the optical path difference and interference intensity in the conventional apparatus shown in FIG. 14;

FIG. 17 is a graph showing a change in interference characteristics upon changing the wavelength in the conventional apparatus shown in FIG. 14; and FIG. 18 is a schematic block diagram showing the arrangement of a conventional polarization dispersion measurement apparatus using an interference method.

DETAILED DESCRIPTION OF THE INVENTION

Figure 2:
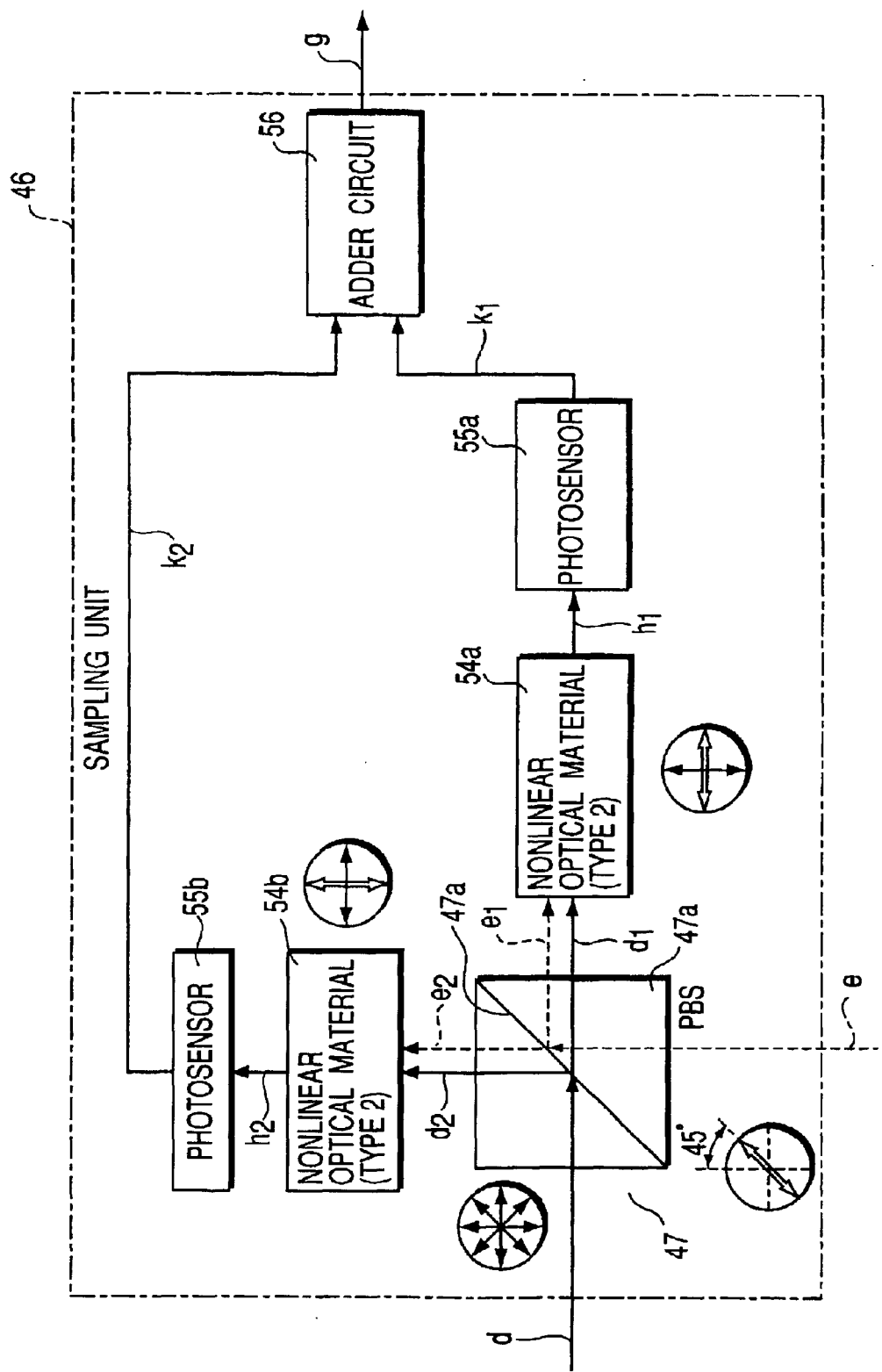
FIG. 2 is a block diagram showing the detailed structure of a sampling unit in the wavelength dispersion measurement apparatus shown in FIG. 1.

Reference will now be made in detail to the presently preferred embodiments of the invention as illustrated in the accompanying drawings, in which like reference numerals designate like or corresponding parts.

An outline of wavelength and polarization dispersion measurement apparatuses applied as a delay time measurement apparatus for an optical element according to the present invention will be explained below.

To solve the conventional problems, a first wavelength dispersion measurement apparatus which is applied as a delay time measurement apparatus for an optical element according to the present invention, comprises a pulse light source for outputting an optical pulse which has a predetermined repetition period, and the wavelength of which is variable, an optical power divider for dividing the optical pulse output from the pulse light source into a reference optical pulse, and an input optical pulse to be input to an object to be measured, spatial optical delay means for changing a relative delay amount of the reference optical pulse with respect to the input optical pulse, sampling means for receiving an output optical pulse that has passed through the object to be measured, and the reference optical pulse which has been delayed by the optical delay means, and obtaining an autocorrelation intensity signal proportional to the light intensity of the output optical pulse at a given position every time the optical delay means changes the relative delay amount of the reference optical pulse, and signal processing means for obtaining an autocorrelation waveform of the output optical pulse from the autocorrelation intensity signals obtained in turn from the sampling means, whereby the wavelength dispersion of the object to be measured is obtained on the basis of the relative delay amount of the reference optical pulse delayed by the optical delay means, which is required for obtaining a peak of the obtained autocorrelation waveform of the output optical pulse.

In the wavelength dispersion measurement apparatus with the above arrangement, the optical pulse output from the pulse light source is divided into the input and reference optical pulses.

The input optical pulse passes through the object to be measured such as an optical fiber or the like to obtain an output optical pulse.

On the other hand, the reference optical pulse is delayed by the optical delay means in an amount which changes in turn.

The sampling means obtains autocorrelation intensity signals of the output optical pulse in turn by calculating correlation between the output optical pulse and the respective reference optical pulses, i.e., autocorrelation since the output optical pulse and the respective reference optical pulses are originally an identical optical pulse and have a relationship of the self and the other self.

The autocorrelation waveform of the output optical pulse is obtained from the autocorrelation intensity signals which are obtained in turn.

That is, the waveform of the output optical pulse is obtained, and a peak value of the output optical pulse waveform (a maximum position of the autocorrelation intensity signals) is obtained.

The detection precision of the peak value of the output optical pulse waveform is determined by the setting precision of the spatial optical delay means, which precision is as high as around 0.003 ps in time.

Then, the delay time of the output optical pulse that has passed through the object to be measured is calculated on the basis of the amount the reference optical pulse is delayed to obtain a peak (peak position) of the autocorrelation waveform obtained after the wavelength $\lambda$ has been changed from the peak position obtained before the wavelength $\lambda$ is changed upon changing the wavelength $\lambda$ of the optical pulse output from the pulse light source, thus obtaining the wavelength dispersion of the object to be measured.

More specifically, the group delay of the output optical pulse upon changing the wavelength $\lambda$ can be measured with a precision of 0.003 ps.

The pulse light source used in the present invention outputs an optical pulse having a predetermined repetition period T in place of continuous light.

As described above, since the conventional interference method uses a white light source, a maximum interference intensity is obtained at a position where the difference between the delay amount produced in the object to be measured and that produced by the optical delay means becomes "0", i.e., the optical path difference therebetween becomes "0".

In other words, the conventional interference method has one and only interference position.

By contrast, when an optical pulse having the repetition period T is used, since the optical pulse is present at the predetermined period T, the autocorrelation waveform can be obtained every predetermined period T.

Hence, the autocorrelation waveform of the output optical pulse can be obtained independently of the absolute amount the output optical pulse is delayed upon traversing the object to be measured such as an optical fiber or the like, and relative delay time differences from the reference optical pulses at the respective wavelengths are obtained, thus allowing to measure the wavelength dispersion of the object to be measured.

Therefore, the wavelength dispersion of a long optical fiber having a length of 20 m or 50 m, which cannot be measured with high precision by the conventional interference method, can be measured with precision as high as that in the interference method.

In a second wavelength dispersion measurement apparatus which is applied as a delay time measurement apparatus for an optical element according to the present invention, the sampling means in the first wavelength dispersion measurement apparatus mentioned above is constructed by a polarization splitter for splitting each of the output and reference optical pulses into two light components having 90° different planes of polarization, combining two pairs of output and reference optical pulses which have been split and have 90° different planes of polarization, and outputting the combined pulses onto different optical paths, a pair of nonlinear optical materials which generate autocorrelation signals of the output and reference optical pulses which have 90° different planes of polarization as SHG (Second Harmonic Generator) light components, and can attain type 2 phase matching, a pair of photosensors for converting the SHG light components output from the nonlinear optical materials into electrical signals, and an adder circuit for adding the electrical signals output from the photosensors, and outputting the sum electrical signal as an autocorrelation intensity signal.

In the sampling means with the above arrangement, the polarization splitter splits each of the output and reference optical pulses into two light components having 90° different planes of polarization, thus generating a total of four light components.

Furthermore, two pairs of light components obtained by combining the output and reference optical pulses to have orthogonal planes of polarization from these four light components are output onto different optical paths.

Then, the two pairs of combined output and reference optical pulses having 90° different planes of polarization are launched into corresponding nonlinear optical materials and are output as different SHG light components.

These SHG light components are converted into electrical signals by the corresponding photosensors, and the electrical signals are added. The sum electrical signal is output as an autocorrelation intensity signal of the output optical pulse.

For this reason, in this arrangement, even when the polarization state of the output optical pulse has changed, since the complementary operation is made, i.e., since the light intensity of combined light output from one optical path of the polarization splitter decreases, but the light intensity of the output optical pulse output from the other optical path increases, an increase/decrease in SHG light component resulting from variations of the polarization state of the output optical pulse can be consequently canceled, and nearly no variation components are contained in the sum electrical signal. Hence, the signal processing means can precisely measure the autocorrelation waveform of the obtained output optical pulse.

In a third wavelength dispersion measurement apparatus which is applied as a delay time measurement apparatus for an optical element according to the present invention, the sampling means in the first wavelength dispersion measurement apparatus mentioned above is constructed by a optical power coupler for combining the output and reference optical pulses to have 90° different planes of polarization, a nonlinear optical material which generates a correlation signal between the output and reference optical pulses, which are output from the optical power coupler and have 90° different planes of polarization, as SHG light, and can attain type 2 phase matching, and a photosensor for converting the SHG light into an electrical signal, and outputting the electrical signal as an autocorrelation intensity signal.

The sampling means with this arrangement uses one nonlinear optical element.

However, in this case as well, when the planes of polarization of the output and reference optical pulses accurately have a 90° difference, sufficiently high measurement precision can be obtained.

In a fourth wavelength dispersion measurement apparatus which is applied as a delay time measurement apparatus for an optical element according to the present invention, the sampling means in the first wavelength dispersion measurement apparatus mentioned above is constructed by a pair of polarization controllers which are inserted in the optical axes of the output and reference optical pulses, and make the planes of polarization of the output and reference optical pulses parallel to each other, a lens which is inserted in the optical axes of the output and reference optical pulses that have passed through the pair of polarization controllers, and focuses the output and reference optical pulses to an identical point, a nonlinear optical material which is located on the focal point of the lens, generates an autocorrelation signal of the output and reference optical pulses as SHG light, and can attain type 1 phase matching, a slit for separating the SHG light generated by the nonlinear optical element from the output and reference optical pulses, and a photosensor for converting the SHG light separated by the slit into an electrical signal, and outputting the electrical signal as an autocorrelation intensity signal.

The second and third wavelength dispersion measurement apparatuses use the nonlinear optical materials of type 2 phase matching with a high S/N ratio as those for generating SHG light.

However, in the fourth wavelength dispersion measurement apparatus, since light components other than the SHG light are removed using the lens and slit, the SHG light can be extracted with sufficiently high precision even by using a nonlinear optical material of type 1 phase matching.

A fifth wavelength dispersion measurement apparatus which is applied as a delay time measurement apparatus for an optical element according to the present invention, comprises a pulse light source for outputting an optical pulse which has a predetermined repetition period, and the wavelength of which is variable, optical power divider means for dividing the optical pulse output from the pulse light source into a reference optical pulse, bypass reference optical pulse, and an input optical pulse to be input to an object to be measured, an optical power coupler for combining the output optical pulse that has passed through the object to be measured, and the bypass reference optical pulse, and outputting combined light, spatial optical delay means for changing a relative delay amount of the reference optical pulse with respect to the input optical pulse, sampling means for receiving the combined light output from the optical power coupler, and the reference optical pulse delayed by the optical delay means, and obtaining an autocorrelation intensity signal proportional to the light intensity of the combined light at a given position every time the optical delay means changes the relative delay amount of the reference optical pulse, and signal processing means for obtaining an autocorrelation waveform of the combined light from the autocorrelation intensity signals obtained in turn from the sampling means, whereby the wavelength dispersion of the object to be measured is obtained on the basis of the spacing between the peaks of the bypass reference optical pulse and output optical pulse contained in the obtained autocorrelation waveform of the combined light.

In the wavelength dispersion measurement apparatus with this arrangement, the optical pulse output from the pulse light source is divided into a reference optical pulse, bypass reference optical pulse, and input optical pulse.

The bypass reference pulse directly bypasses the object to be measured.

The output pulse that has passed through the object to be measured, and the bypass reference optical pulse that bypasses it are combined to obtain combined light.

The sampling means sequentially calculates autocorrelation intensity signals between the combined light and the reference optical pulse whose relative delay amount changes sequentially, thus obtaining the autocorrelation waveform of the combined light.

As in the first wavelength dispersion measurement apparatus, the delay amount is obtained from the reference time position of the output pulse.

When the wavelength of an optical pulse output from the pulse light source has changed, if the output phase of the optical pulse after the wavelength has changed shifts from the phase of the optical pulse before the wavelength is changed due to some reason, the measurement result changes as if apparently the delay amount had changed.

That is, when the wavelength is changed to measure the wavelength dispersion, the measurement result changes as if the delay amount had changed due to the wavelength dispersion, although the delay amount had not actually changed due to actual dispersion, thus posing a problem in measurement.

In such case, the delay amount can be calculated from the reference time position of the bypass reference optical pulse contained in the combined light, and the difference between that delay amount and the previously obtained delay amount of the output optical pulse. More specifically, the delay amount of the output pulse in the combined light from the bypass reference optical pulse is calculated.

In a sixth wavelength dispersion measurement apparatus which is applied as a delay time measurement apparatus for an optical element according to the present invention, the pulse light source in the first or fifth wavelength dispersion measurement apparatus is constructed by a white pulse light source for outputting a white optical pulse which has a predetermined repetition period and a broad wavelength range, and a spectroscope for extracting and outputting an optical pulse having a designated single wavelength from the white optical pulse output from the white pulse light source.

In this manner, when the pulse light source is constructed by a white pulse light source and spectroscope, an optical pulse which has a predetermined repetition period and the wavelength of which is variable can be obtained.

A first polarization dispersion measurement apparatus which is applied as a delay time measurement apparatus for an optical element according to the present invention comprises a pulse light source for outputting an optical pulse which has a predetermined repetition period and a single wavelength, an optical power divider for dividing the optical pulse output from the pulse light source into a reference optical pulse and an input optical pulse to be input to an object to be measured, an analyzer for passing a component in a specific direction of polarization in an output optical pulse that has passed through the object to be measured, spatial optical delay means for changing a relative delay amount of the reference optical pulse with respect to the input optical pulse, sampling means for receiving the output optical pulse that has passed through the analyzer, and the reference optical pulse that has been delayed by the optical delay means, and obtaining an autocorrelation intensity signal proportional to the light intensity of the output optical pulse at a given position every time the optical delay means changes the relative delay amount of the reference optical pulse, and signal processing means for obtaining an autocorrelation waveform of the output optical pulse from the autocorrelation intensity signals obtained in turn from the sampling means, whereby the polarization dispersion of the object to be measured is obtained on the basis of the relative delay amount of the reference optical pulse delayed by the optical delay means, which is required for obtaining a peak of the obtained autocorrelation waveform of the output optical pulse.

In the polarization dispersion measurement apparatus with this arrangement, the analyzer for passing a component in the specific direction of polarization in the output optical pulse is inserted in the optical path of the output optical pulse that has passed through the object to be measured.

The output optical pulse having a component in the specific direction of polarization, and the reference optical pulse whose relative phase is changed sequentially by the optical delay means are input to the sampling means.

The sampling means outputs an autocorrelation intensity signal of the output optical pulse having a component in the specific direction of polarization.

The signal processing means calculates the autocorrelation waveform of the output optical pulse having a component in the specific direction of polarization.

Hence, by measuring the delay time of a peak indicated by the component in the specific direction of polarization in the output optical pulse from a peak of the reference optical pulse on the basis of the waveform of the combined light by the same method as that in the aforementioned wavelength dispersion measurement apparatus, the delay time in that direction of polarization is obtained.

By sequentially changing the direction of polarization of the analyzer, the polarization dispersions of the object to be measured can be obtained.

The embodiments of the present invention based on the aforementioned outline will be explained below with reference to the accompanying drawings.

First Embodiment

FIG. 1 is a schematic block diagram showing a wavelength dispersion measurement apparatus which is applied as the first embodiment of a delay time detection apparatus for an optical element according to the present invention.

As shown in FIG. 1, a reference signal generator 41 outputs a reference signal having a frequency $f_0$ (=9.95328 GHz) to a pulse light source 42.

The pulse light source 42 is a tunable light source, and comprises a mode-locked ring EDF laser that outputs a transform-limited optical pulse. The pulse light source 42 outputs an optical pulse a having a repetition frequency (repetition period T) which is equal to the reference frequency $f_0$.

Note that the measurement precision can be further improved if a TL pulse (transform-limited pulse) is used as the optical pulse. The wavelength $\lambda$ of optical pulse a is controlled to vary in accordance with a wavelength control signal output from a controller 43 that monitors and controls the overall measurement process.

The optical pulse a output from the pulse light source 42 is divided by an optical power divider 44 into an input optical pulse b to be input to an object 45 to be measured, which comprises, e.g., an optical element such as an optical fiber or the like, and a reference optical pulse c.

The input optical pulse b that has passed through the object 45 to be measured is launched into one input terminal of a polarization splitter 47 in a sampling unit 46 as an output optical pulse d.

The other reference optical pulse c divided by the optical power divider 44 is delayed by an optical delay device 48 and is launched into the other input terminal of the polarization splitter 47 in the sampling unit 46 as a new reference optical pulse e.

The detailed arrangement and operation of the optical delay device 48 will be explained below.

The reference optical pulse c output from the optical power divider 44 enters a corner cube mirror 51, which is movably provided on an optical stage 50, via a collimator 49a in the optical delay device 48.

The corner cube mirror 51 reverses the optical path of the incoming reference optical pulse c through 180°, and outputs that pulse to the other terminal of the polarization splitter 47 in the sampling unit 46 via a collimator 49b as a new reference optical pulse e.

The position of the corner cube mirror 51 on the optical stage 50 is controlled by a spatial optical delay element controller 52 comprising a stepping motor with a rotary encoder, which can be controlled by an optical delay element drive signal input from a signal processor 53.

When the position of the corner cube mirror 51 on the optical stage 50 has changed, the optical path length of the reference optical pulse c changes.

Hence, by changing the optical path length by the spatial optical delay element controller 52, the relative phase (relative delay amount) of the reference optical pulse e to be input from the optical delay device 48 to the other terminal of the polarization splitter 47 with respect to the input optical pulse b can be arbitrarily set.

More specifically, the signal processor 53 outputs an optical delay element drive signal to the spatial optical delay element controller 52 to move the optical stage 50 a predetermined small distance $\Delta TL$ (=$\Delta T$ in time) every predetermined period Ta.

The sampling unit 46 will be described in detail below using FIG. 2.

The polarization splitter 47, a nonlinear optical material 54a, and a photosensor 55a are provided on the optical axis of the output optical pulse d output from the object 45 to be measured.

On the other hand, the polarization splitter 47, a nonlinear optical material 54b, and a photosensor 55b are provided on the optical axis of the reference optical pulse e output from the optical delay device 48.

Furthermore, an adder circuit 56 for adding electrical signals $k_1$ and $k_2$ output from the photosensors 55a and 55b is assembled.

The operation principle which allows measurement of delay amounts in units of wavelengths using the sampling unit 46 with the above arrangement will be explained below with reference to FIGS. 3A to 3F and FIG. 4.

For example, the period of the output optical pulse d which is obtained by dividing the optical pulse a having the repetition frequency $f_0$ (period T) and has passed through the object 45 to be measured, and that of the reference optical pulse c before it passes through the optical delay device 48 are T, i.e., are equal to each other, since these pulses are originally an optical pulse output from a single light source.

However, the phase of the output optical pulse d that has passed through the object 45 to be measured does not match that of the reference optical pulse c before it passes through the optical delay device 48.

Assume that the phase shift at that time is $T_D$.

When the delay amount of the reference optical pulse e in the optical delay device 48 is changed by a spatial distance corresponding to ΔT, the reference optical pulse e input to the sampling unit 46 can give an arbitrary delay amount to the reference optical pulse c.

At this time, the maximum value of the delay amount given by the optical delay device 48 suffices to be equal to the period T of the optical pulse.

Figure 3A:
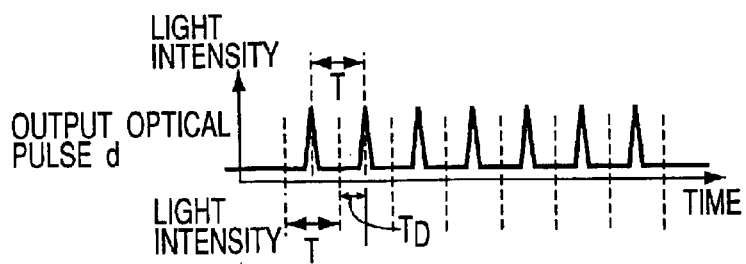
FIGS. 3A to 3F are charts for explaining the principle of optical signal waveform measurement using SHG light.
Figure 3B:
Figure 3C:
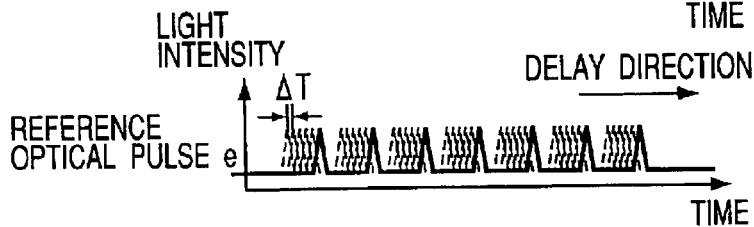

In this manner, when the delay time of the reference pulse e is changed in increments of ΔT, the phases of the reference optical pulse e and the output optical pulse d eventually match, as shown in FIGS. 3A to 3C.

If g represents an autocorrelation intensity signal between the reference optical pulse e and output optical pulse d, when the phases of the reference optical pulse e and output optical pulse d perfectly match, the autocorrelation intensity signal g assumes a maximum value.

Figure 3D:
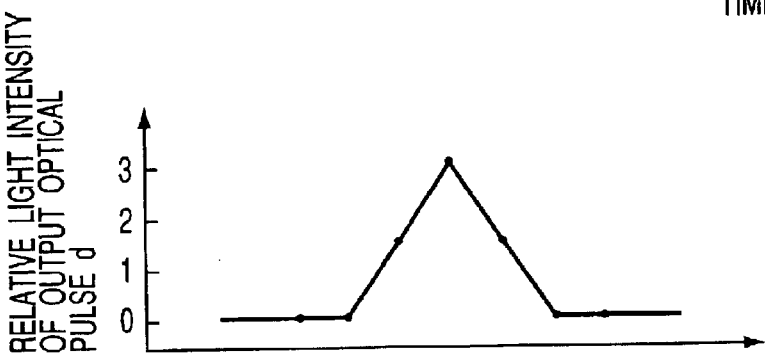
Figure 3E:
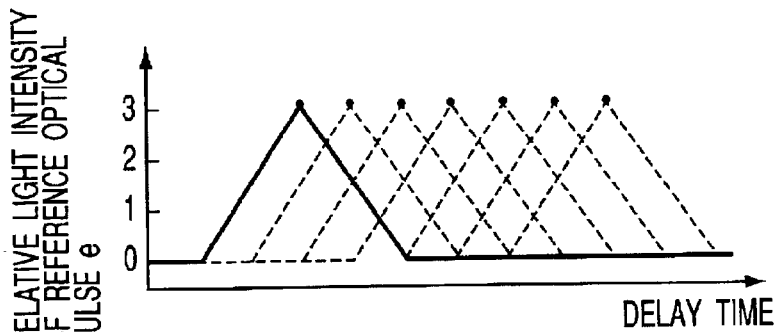
Figure 3F:
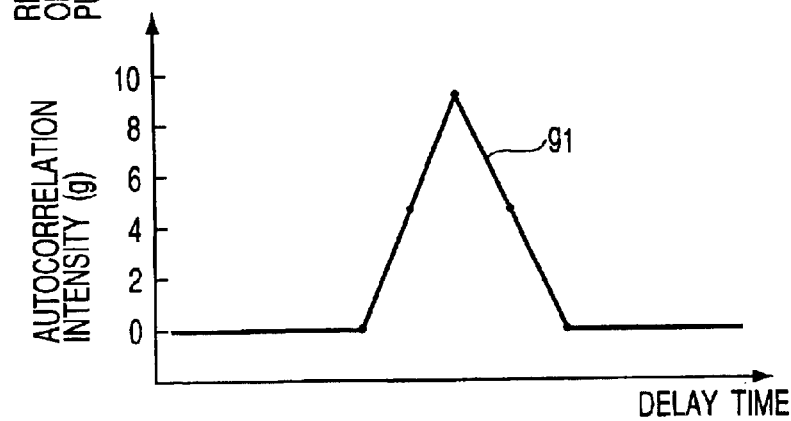

Hence, when the delay time of the reference optical pulse e with respect to the output optical pulse d is gradually changed, the value of the autocorrelation intensity signal g increases and then decreases in accordance with the waveform of the output optical pulse d, as shown in FIGS. 3D to 3F.

That is, paying attention to the envelope waveform of the autocorrelation intensity signal g obtained from the output optical pulse d and reference optical pulse e, an autocorrelation waveform $g_1$ of the optical pulse is obtained.

Thus, by measuring variable delay amounts in the optical delay device 48, which are required for obtaining a peak of the autocorrelation waveform $g_1$ shown in FIG. 3F while the wavelength λ of the optical pulse a output from the pulse light source 42 has changed, the wavelength dispersion can be obtained.

The reason why the autocorrelation intensity signal g is output when the timings of the reference optical pulse e and output optical pulse d match will be explained below using FIG. 4.

As is generally known, when the output optical pulse d and reference optical pulse e as a pair of light components which have slightly different frequencies $\omega_S$ and $\omega_D$ are simultaneously launched into one surface of the nonlinear optical material 54a (54b) of type 2 phase matching while their planes of polarization are maintained perpendicular to each other, as shown in FIG. 4, sum frequency light h which is proportional to the product of the intensities of two light components d and e and has their sum frequency is output from the other surface only when the two light components d and e are simultaneously superposed on each other.

Note that the frequencies $\omega_S$ and $\omega_D$ are equal to each other in this method since the aforementioned pulses are derived from an optical pulse output from a single light source.

Hence, in the description so far, the two light components that are launched into the nonlinear optical material have slightly different frequencies, but the actually obtained sum frequency light h is output as second harmonic generator light (SHG light) of the optical frequency of the optical pulse a.

That is, the second harmonic generator light (SHG light) is output as the aforementioned autocorrelation intensity signal g.

Also, in this method, since the wavelength dispersion is obtained from the wavelength dependence of the peak position of the autocorrelation waveform $g_1$, the repetition frequency of the optical pulse a defines a maximum measurable delay amount, while the moving resolution of the optical delay device 48 determines the measurement resolution of the delay amount.

The sampling unit 46 in FIG. 1 will be described below using FIG. 2.

Note that the nonlinear optical material of type 2 phase matching used in the apparatus of this embodiment is normally used to obtain sum frequency light, and the second harmonic generator light (SHG light) is a specific case of the sum frequency signal.

Hence, the following explanation will be given using sum frequency light when frequencies f of two light components are slightly different from each other.

Referring to FIG. 2, the output optical pulse d input to the sampling unit 46 enters the polarization splitter 47.

On the other hand, the reference optical pulse e indicated by the broken line has a single plane of polarization in a 45° direction with respect to a reference direction (0° direction), as shown in FIG. 2.

This reference optical pulse e also enters the polarization splitter 47.

For example, a half mirror 47a whose surface has a polarization coat is assembled in the polarization splitter 47 comprising, e.g., a polarization beam splitter (PBS) or the like.

The half mirror 47a passes a polarization component of incoming light, which is in a 90° direction with respect to the reference direction (0° direction), and reflects a polarization component of the incoming light, which is in the reference direction (0° direction).

Hence, a polarization component $e_1$ in the reference direction of the reference optical pulse e having a plane of polarization in nearly the 45° direction, and a polarization component $d_1$ in the 90° direction of the output pulse d enter the type 2 nonlinear optical material 54a.

On the other hand, a polarization component $e_2$ in the 90° direction of the reference optical pulse e, and a polarization component $d_2$ in the reference direction of the output pulse d enter another type 2 nonlinear optical material 54b.

Since the nonlinear optical element 54a receives the reference optical pulse $e_1$ and output optical pulse $d_1$ whose planes of polarization are set in 90° different directions, phase matching is satisfied, and the type 2 nonlinear optical material 54a outputs SHG light (sum frequency light) $h_1$ having the sum angular frequency to the next photosensor 55a.

Likewise, since the nonlinear optical element 54b receives the reference optical pulse $e_2$ and output optical pulse $d_2$ whose planes of polarization are set in 90° different directions, phase matching is satisfied, and the type 2 nonlinear optical material 54b outputs SHG light (sum frequency light) $h_2$ having the sum angular frequency to the next photosensor 55b.

The photosensors 55a and 55b respectively convert the incoming SHG light (sum frequency light) components $h_1$ and $h_2$ into electrical signals $k_1$ and $k_2$, and send the converted signals to the adder circuit 56.

The adder circuit 56 adds the electrical signals $k_1$ and $k_2$, and outputs the sum signal as the autocorrelation intensity signal g to the signal processor 53 shown in FIG. 1.

In such optical sampling unit 46, since the plane of polarization of the reference optical pulse e output from the optical delay device 48 is set in nearly the 45° direction from the reference direction, and the half mirror 47a of the polarization splitter 47 is set in nearly the 45° direction with respect to the optical axes of the reference optical pulse e and output optical pulse d, the transmitted light intensity and reflected light intensity in the polarization splitter 47 are nearly equal.

That is, the light intensity of the polarization component $e_1$ in the reference direction and that of the polarization component $e_2$ in the 90° direction with respect to the reference direction of the reference optical pulse e split by the polarization splitter 47 are nearly equal.

On the other hand, since the polarization state of the output pulse d that has passed through the object 45 to be measured is disturbed by the state of the object 45 to be measured, the light intensity of the output optical pulse $d_2$ having a plane of polarization in the reference direction, and that of the output optical pulse $d_1$ having a plane of polarization in the 90° direction with respect to the reference direction, which are output from the polarization splitter 47, do not equal each other.

As a result, the SHG light (sum frequency light) components $h_1$ and $h_2$ output from the nonlinear optical materials 54a and 54b do not equal each other.

However, since the electrical signal obtained by adding the electrical signals $k_1$ and $k_2$, which are obtained by photoelectrically converting the SHG light (sum frequency light) components $h_1$ and $h_2$ by the photosensors 55a and 55b, is a signal obtained by dividing originally one output optical pulse d, the electrical signals $k_1$ and $k_2$ act complementarily, and a change in waveform of the output optical pulse d resulting from a variation of the polarization state of the output optical pulse d is canceled.

That is, since the electrical signal obtained by adding the electrical signals $k_1$ and $k_2$ is stable, the signal processor 53 and controller 43 can accurately measure the autocorrelation waveform indicating the waveform of the output optical pulse d and the delay time (delay amount) of the reference optical pulse e corresponding to the peak value of this autocorrelation waveform irrespective of the polarization state of the output optical pulse d.

As has been described above using FIGS. 3A to 3F, the signal processor 53 obtains the autocorrelation waveform $g_1$ from the autocorrelation intensity signals g sequentially input from the sampling unit 46, and outputs it to the controller 43 comprising a computer.

The controller 43 calculates a delay time $t_D$ of the output optical pulse d from the reference optical pulse c serving as a reference signal on the basis of the delay time (delay amount) of the reference optical pulse e corresponding to the peak value of the autocorrelation waveform $g_1$.

Since the measurement of the delay time $t_D$ corresponding to one waveform λ is completed in this way, the controller 43 outputs a waveform control signal to the pulse light source 42 to change the wavelength λ of the optical pulse a to be output.

The aforementioned measurement of the delay time $t_D$ repeats itself for the changed wavelength λ.

Finally, the dependence of the delay time $t_D$ on the wavelength λ, i.e., the wavelength dispersion characteristics of the object 45 to be measured such as an optical fiber, or the like are obtained.

In the wavelength dispersion measurement apparatus of the first embodiment with the above arrangement, an optical pulse a output from the pulse light source a is divided into an input optical pulse b and reference optical pulse c.

The input optical pulse b passes through the object 45 to be measured such as an optical fiber or the like to obtain an output optical pulse d.

The reference optical pulse c is converted by the optical delay device 48 into reference optical pulses e whose delay amounts change sequentially.

The sampling unit 46 calculates an autocorrelation function between the output optical pulse d and the reference optical pulses e which are delayed in units of ΔT, thus sequentially obtaining autocorrelation intensity signals g.

The autocorrelation waveform $g_1$ that indicates the waveform of the output optical pulse d is obtained from the autocorrelation intensity signals g obtained sequentially.

Then, the peak value of this autocorrelation waveform $g_1$ (the maximum position of the autocorrelation intensity signals g) is obtained.

The detection precision of this peak value is determined by the setting precision of the spatial optical delay device 48.

This setting precision is as high as around 0.003 ps in time.

The delay time $t_D$ of the output optical pulse d that has passed through the object 45 to be measured is obtained on the basis of the amount the reference optical pulse e is delayed to obtain the peak (peak position) of the autocorrelation waveform $g_1$ obtained after the wavelength λ has been changed from the peak position obtained before the wavelength λ is changed upon changing the wavelength λ of the optical pulse a to be output from the pulse light source 42 by the controller 43, thus obtaining the wavelength dispersion of the object to be measured.

That is, using the spatial optical delay device 48, the group delay of the output optical pulse upon changing the wavelength λ can be measured with a precision of 0.003 ps.

Hence, the wavelength dispersion measurement precision of the wavelength dispersion measurement apparatus as a whole can be improved up to 0.003 ps.

The pulse light source 42 outputs the optical pulse a having the predetermined repetition period T in place of continuous light.

Therefore, the reference optical pulse d basically becomes an optical pulse having the predetermined repetition period T.

As shown in, e.g., FIGS. 5A and 5B, when the output optical pulse d having a reference wavelength $\lambda_1$ is delayed by $t_{D1}$ from an appropriate reference time, the time difference of the reference optical pulse e from the reference time is Tb, and the time difference between the reference optical pulse e and output optical pulse d having the reference wavelength $\lambda_1$ is Tc, the reference optical pulse e can be matched with the output optical pulse d by adjusting the delay amount of the optical delay device 48.

More specifically, the time difference Tc can be removed by increasing the delay amount or the time difference Tb can be removed by decreasing the delay amount.

In other words, pulses at an identical timing before being divided by the optical power divider 44 need not be matched.

In this case, since Tb>Tc, the time difference Tc is removed by increasing the delay amount, as shown in FIGS. 5C and 5D.

A time difference Tb1 of the output optical pulse d from the reference time after removal is set to be a new reference time difference.

Assume that the output optical pulse d is delayed by $t_{D2}$ from the reference time upon changing the wavelength of the optical pulse a to $\lambda_2$, as shown in FIGS. 5E and 5F.

When the state shown in FIGS. 5G and 5H is attained by adjusting the delay amount of the reference optical pulse e by the optical delay device 48 to match this output optical pulse d, a time difference Tb2 of the reference optical pulse e from the reference time at that time is obtained.

More specifically, a relative delay amount with respect to the reference wavelength $\lambda_1$ at the wavelength $\lambda_2$ is (Tb2−Tb1).

In this manner, in the apparatus of this embodiment, since the optical pulse a having the repetition period T is used, and is present every predetermined period T, the autocorrelation waveform $g_1$ can be obtained every repetition period T.

That is, the maximum delay adjustment range required for the optical delay device 48 corresponds to one repetition period T.

Hence, in the apparatus of this embodiment, the autocorrelation waveform $g_1$ of the output optical pulse d is obtained independently of the absolute delay amount of the output optical pulse d upon passing through the object 45 to be measured such as an optical fiber or the like, a relative delay time difference from the reference optical pulse e at each wavelength $\lambda$ is obtained, and the wavelength dispersion of the object 45 to be measured can be measured.

Therefore, the apparatus of this embodiment can realize a delay time detection apparatus for an optical element, which can measure the wavelength dispersion of a long optical fiber having a length of 20 m or 50 m, which cannot be measured with high precision by the conventional interference method, with precision as high as that in the interference method.

Second Embodiment

Figure 6:
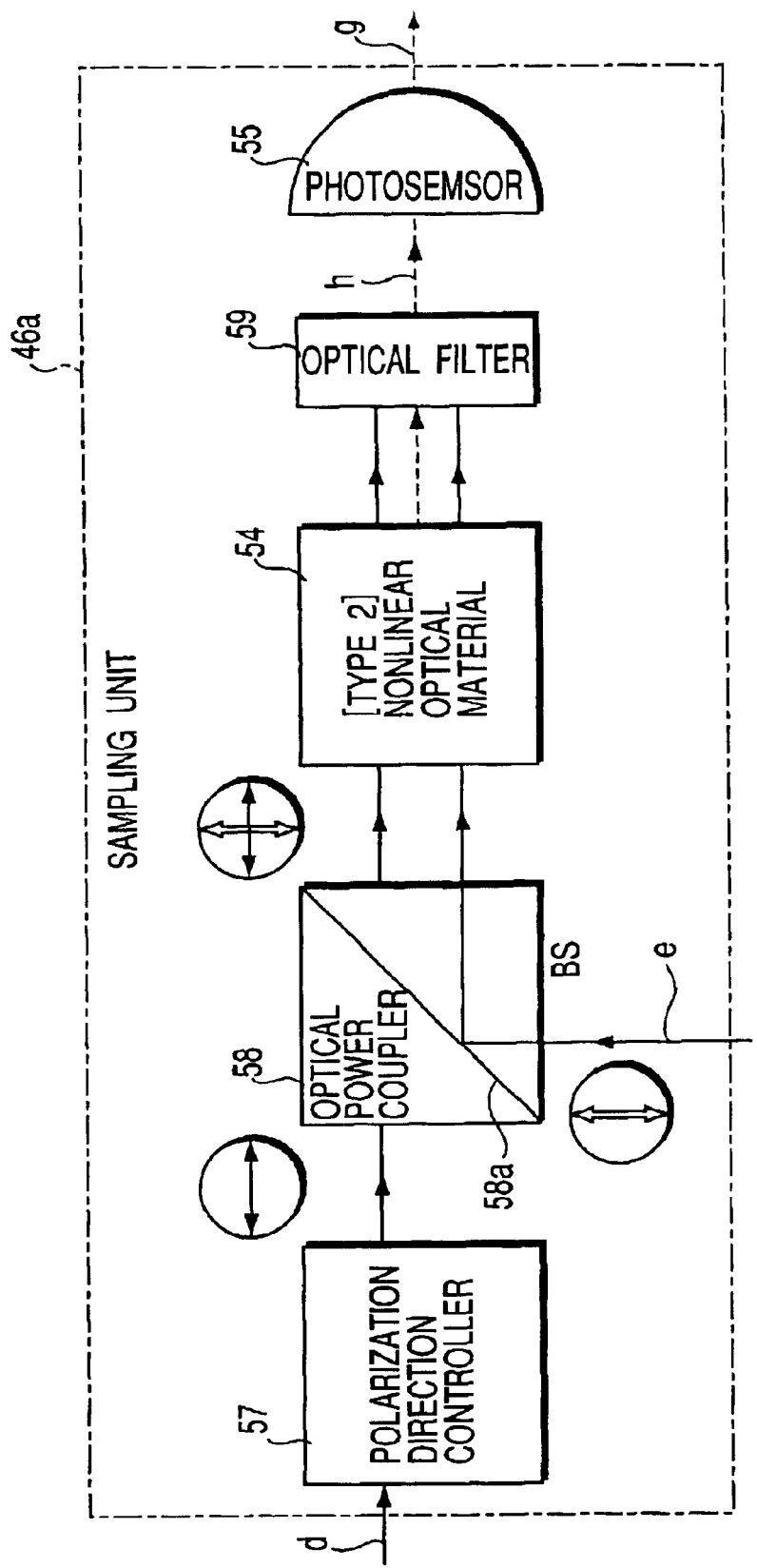
FIG. 6 is a block diagram showing the detailed structure of a sampling unit in a wavelength dispersion measurement apparatus which is applied as the second embodiment of a delay time measurement apparatus for an optical element according to the present invention.

FIG. 6 is a schematic block diagram showing the arrangement of a sampling unit 46a assembled in a waveform dispersion measurement apparatus applied as the second embodiment of a delay time detection apparatus for an optical element according to the present invention.

In FIG. 6, since the arrangement other than this sampling unit 46a is the same as that in the wavelength dispersion measurement apparatus of the first embodiment shown in FIG. 1, a detailed description thereof will be omitted.

As shown in FIG. 6, an output optical pulse d output from the object 45 to be measured shown in FIG. 1 is input to a polarization direction controller 57 to control its direction of polarization in a 90° direction with respect to the reference direction. The output optical pulse d then enters a optical power coupler 58 which comprises a beam splitter having the same arrangement as that of the polarization splitter 47 in the first embodiment.

The output optical pulse d that has been transmitted through a half mirror 58a of the optical power coupler 58 enters a type 2 nonlinear optical material 54.

On the other hand, a reference optical pulse e, which is output from the optical delay device 48 and is set to have a direction of polarization agreeing with the reference direction, directly enters the optical power coupler 58.

The reference optical pulse e reflected by the half mirror 58a of the optical power coupler 58 enters the type 2 nonlinear optical material 54.

As the type 2 nonlinear optical material 54 receives the reference optical pulse e and output optical pulse d whose planes of polarization are set in 90° different directions, phase matching is satisfied, and the type 2 nonlinear optical material 54 outputs SHG light h having the sum angular frequency to a photosensor 55 via an optical filter 59.

Note that the optical filter 59 is inserted to remove unwanted wavelength components from the SHG light h.

The photosensor 55 converts the received SHG light h into an electrical signal, and outputs it as an autocorrelation intensity signal g to the next signal processor 53 shown in FIG. 1.

In the sampling unit 46a having this arrangement as well, since an autocorrelation intensity signal g proportional to the intensity of the output optical pulse d obtained in synchronism with the reference optical pulse e can be obtained upon receiving the output optical pulse d and reference optical pulse e, nearly the same operations and effects as those of the sampling unit 46 shown in FIG. 2 can be obtained.

The wavelength dispersion measurement apparatus of the second embodiment which incorporates this sampling unit 46a can also realize a delay time detection apparatus for an optical element which can obtain substantially the same effects as those of the wavelength dispersion measurement apparatus of the first embodiment.

Third Embodiment

Figure 7:
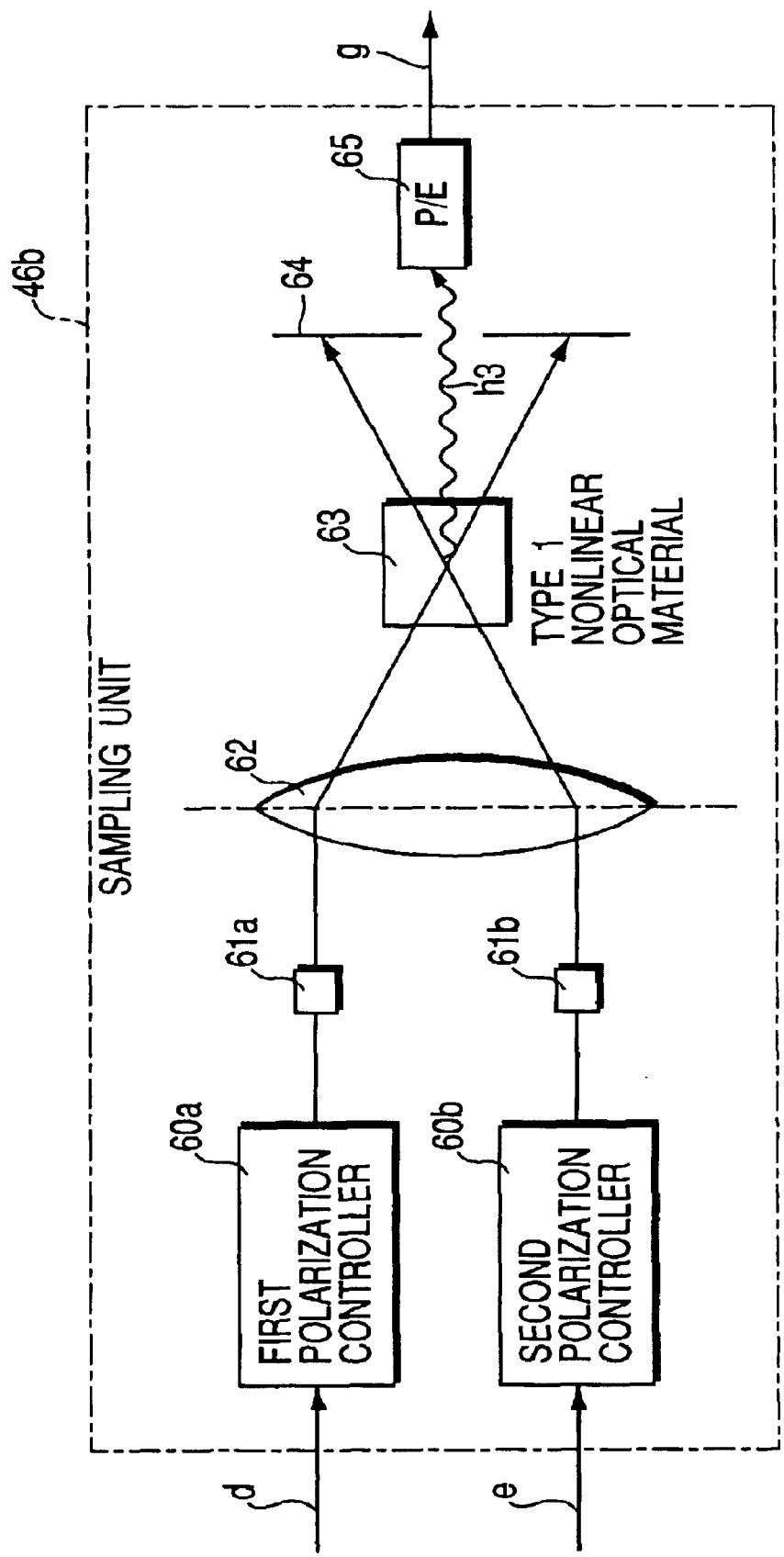
FIG. 7 is a block diagram showing the detailed structure of a sampling unit in a wavelength dispersion measurement apparatus which is applied as the third embodiment of a delay time measurement apparatus for an optical element according to the present invention.

FIG. 7 is a schematic block diagram showing the arrangement of a sampling unit 46b assembled in a waveform dispersion measurement apparatus applied as the third embodiment of a delay time detection apparatus for an optical element according to the present invention.

In FIG. 7, since the arrangement other than this sampling unit 46b is the same as that in the wavelength dispersion measurement apparatus of the first embodiment shown in FIG. 1, a detailed description thereof will be omitted.

As shown in FIG. 7, an output optical pulse d output from the object 45 to be measured shown in FIG. 1 enters a lens 62 via a first polarization direction controller 60a and light collimator 61a.

On the other hand, a reference optical pulse e output from the optical delay device 48 enters the lens 62 via a second polarization direction controller 60b and light collimator 61b.

Note that the directions of polarization of light components output from the first and second polarization direction controllers 60a and 60b agree with each other.

Hence, the planes of polarization of the output optical pulse d and reference optical pulse e become parallel to each other.

The lens 62 focuses the incoming output optical pulse d and reference optical pulse e to a single focal point position.

A type 1 (type 1 phase matching) nonlinear optical material 63 is placed at the focal point position of the lens 62.

Therefore, SHG light $h_3$ having the sum angular frequency of the output optical pulse d and reference optical pulse e emerges from the other surface of this type 1 nonlinear optical material 63.

A slit member 64 is inserted in the optical axis of the SHG light $h_3$ to extend in the direction perpendicular to the optical axis.

As shown in FIG. 7, the slit member 64 passes only the SHG light $h_3$, and intercepts the output optical pulse d and reference optical pulse e refracted by the lens 63.

The SHG light $h_3$ that has passed through the slit member 64 enters a photosensor 65.

The photosensor 65 converts the received SHG light $h_3$ into an electrical signal, and outputs it as an autocorrelation intensity signal g to the next signal processor 53 shown in FIG. 1.

In the sampling unit 46b having this arrangement as well, since an autocorrelation intensity signal g proportional to the intensity of the output optical pulse d obtained in synchronism with the reference optical pulse e can be obtained upon receiving the output optical pulse d and reference optical pulse e, nearly the same operations and effects as those of the sampling unit 46 shown in FIG. 2 can be obtained.

The wavelength dispersion measurement apparatus of the third embodiment which incorporates this sampling unit 46b can also realize a delay time detection apparatus for an optical element which can obtain substantially the same effects as those of the wavelength dispersion measurement apparatus of the first embodiment.

Fourth Embodiment

FIG. 8 is a schematic block diagram showing the arrangement of a wavelength dispersion measurement apparatus applied as the fourth embodiment of a delay time detection apparatus for an optical element according to the present invention.

The same reference numerals in FIG. 8 denote the same parts as those in the wavelength dispersion measurement apparatus of the first embodiment shown in FIG. 1, and a detailed description thereof will be omitted.

AS shown in FIG. 8, in the wavelength dispersion measurement apparatus of the fourth embodiment, an optical pulse a output from the pulse light source 42 is divided by two optical power dividers 44a and 44b into three optical pulses, i.e., an input optical pulse b to be input to the object 45 to be measured, a reference optical pulse c to be input to the optical delay device 48, and a bypass reference optical pulse m that bypasses the object 45 to be measured.

An output optical pulse d that has passed through the object 45 to be measured, and the bypass reference optical pulse m that has bypassed the object 45 to be measured are combined into combined light p by an optical power coupler 66, and the combined light p is launched into one input terminal of the polarization splitter 47 of the sampling unit 46.

The other input terminal of this polarization splitter 47 receives a reference optical pulse e delayed by the optical delay device 48.

In the wavelength dispersion measurement apparatus of the fourth embodiment with the above arrangement, as shown in FIGS. 9A to 9E, the combined light p contains the output optical pulse d that has passed through the object 45 to be measured, and the bypass reference optical pulse m that has bypassed the object 45 to be measured.

The sampling unit 46 sequentially calculates autocorrelation intensity signals g between this combined light p and reference optical pulses e whose relative delay amounts are varied in turn by the optical delay device 48.

As a result, an autocorrelation waveform $g_1$ of the combined light p is obtained.

After that, as in the wavelength dispersion measurement apparatus of the first embodiment shown in FIG. 1, a delay time (delay amount) is calculated from the reference time position of the output optical pulse d.

By the same method, the delay amount of the bypass reference optical pulse m contained in this combined light m from the reference time position is calculated based on the autocorrelation waveform $g_1$ of the combined light p.

By subtracting the delay time of the bypass reference optical pulse m from that of the output optical pulse d, an accurate delay time $t_D$ produced when the optical pulse passes through the object 45 to be measured can be measured.

When the wavelength λ of the optical pulse a output from the pulse light source 42 has been changed, the apparent delay amount changes if the phase shifts with respect to an original wavelength.

As a result, the delay amount may change although the delay amount remains the same upon changing the wavelength.

Hence, in the wavelength dispersion measurement apparatus of the fourth embodiment, since the times of the bypass reference optical pulse m and output optical pulse d simultaneously contained in the combined light p are obtained on the single autocorrelation waveform $g_1$, the factor of phase shift upon changing the wavelength λ can be consequently excluded.

According to the wavelength dispersion measurement apparatus of the fourth embodiment, a delay time detection apparatus for an optical element that can further improve the wavelength dispersion measurement precision can be realized.

Fifth Embodiment

Figure 10:
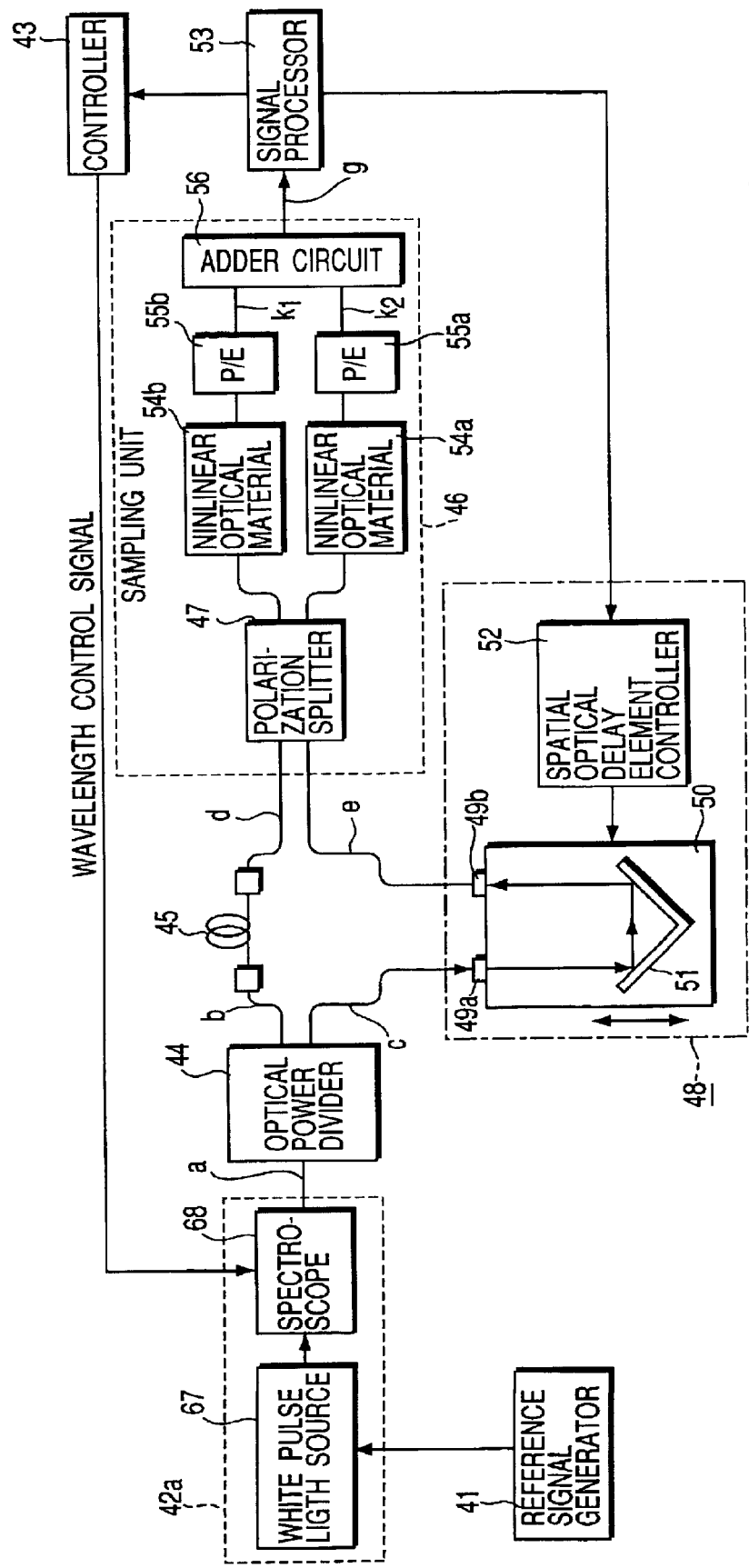
FIG. 10 is a block diagram showing the detailed structure of a sampling unit in a wavelength dispersion measurement apparatus which is applied as the fifth embodiment of a delay time measurement apparatus for an optical element according to the present invention.
Figure 12:
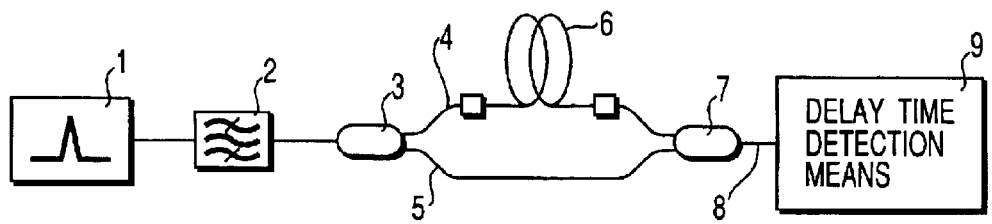
FIG. 12 is a schematic block diagram showing the arrangement of a conventional wavelength dispersion measurement apparatus using a pulse method.
Figure 13:
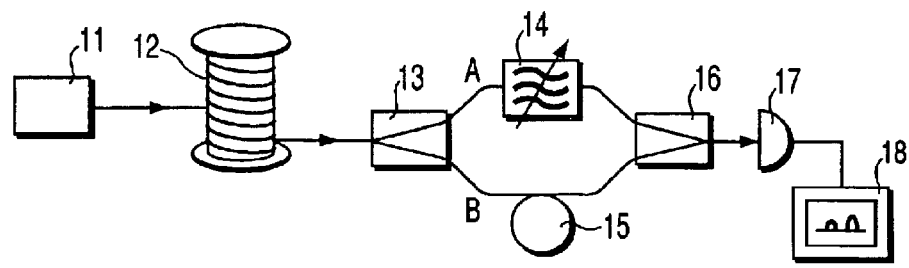
FIG. 13 is a schematic block diagram showing the arrangement of a conventional wavelength dispersion measurement apparatus using a pulse method.
Figure 14:
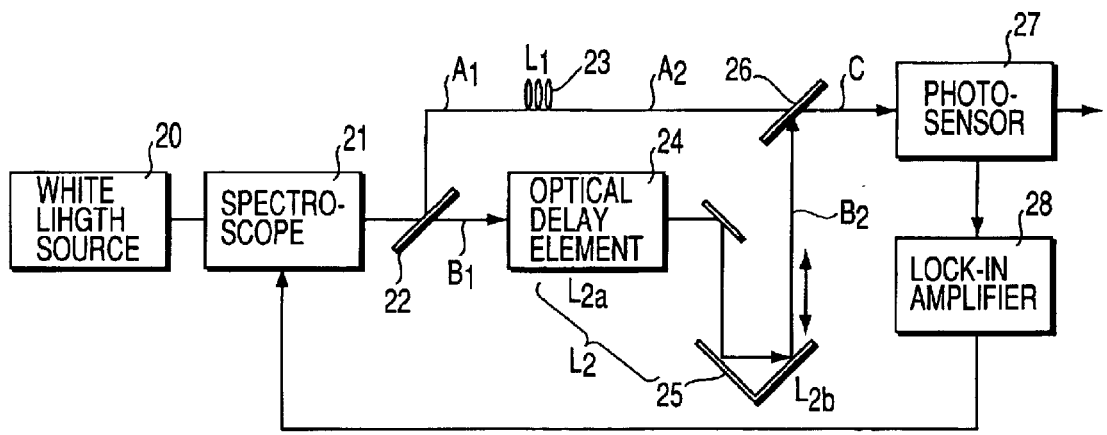
FIG. 14 is a schematic block diagram showing the arrangement of a conventional wavelength dispersion measurement apparatus using an interference method.
Figure 15:
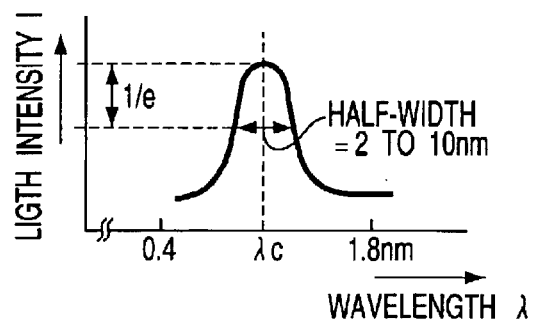
FIG. 15 is a graph showing the spectrum characteristics of a spectroscope built in the conventional apparatus shown in FIG. 14.

FIG. 10 is a schematic block diagram showing the arrangement of a wavelength dispersion measurement apparatus applied as the fifth embodiment of a delay time detection apparatus for an optical element according to the present invention.

The same reference numerals in FIG. 10 denote the same parts as those in the wavelength dispersion measurement apparatus of the first embodiment shown in FIG. 1, and a detailed description thereof will be omitted.

As shown in FIG. 10, in the wavelength dispersion measurement apparatus of the fifth embodiment, a pulse light source 42a that outputs an optical pulse a is constructed by a white pulse light source 67 and a spectroscope 68.

More specifically, the white pulse light source 67 outputs a white optical pulse which has a predetermined repetition period T on the basis of a reference signal having a frequency $f_0$ input from the reference signal generator 41, and a broad wavelength range.

On the basis of a wavelength control signal from the controller 43, the spectroscope 68 extracts and outputs an optical pulse a having a single wavelength λ designated by the wavelength control signal from the white optical pulse output from the white pulse light source 67.

The optical pulse a output from the pulse light source 42a is divided by the optical power divider 44 into an input optical pulse b to be input to the object 45 to be measured, and a reference optical pulse c to be input to the optical delay device 48.

In the wavelength dispersion measurement apparatus of the fifth embodiment having the above arrangement as well, as the pulse light source 42a outputs the optical pulse a which has the predetermined repetition period T and whose wavelength is variable, a delay time detection apparatus for an optical element which can obtain substantially the same effects as those of the wavelength dispersion measurement apparatus of the first embodiment can be realized.

Sixth Embodiment

FIG. 11 is a schematic block diagram showing the arrangement of a polarization dispersion measurement apparatus applied as the sixth embodiment of a delay time detection apparatus for an optical element according to the present invention.

The same reference numerals in FIG. 11 denote the same parts as those in the wavelength dispersion measurement apparatus of the first embodiment shown in FIG. 1, and a detailed description thereof will be omitted.

As shown in FIG. 11, the reference signal generator 41 sends a reference signal to the pulse light source 42.

The pulse light source 42 outputs an optical pulse a which is synchronous with the reference signal and has a repetition period T.

The wavelength λ of the optical pulse a output from the pulse light source 42 is controlled to be varied by a wavelength control signal output from a controller 43a.

The optical pulse a output from the pulse light source 42 is divided by an optical power divider 44 into an input optical pulse b to be input to the object 45 to be measured comprising an optical fiber, and a reference optical pulse c to be input to the optical delay device 48.

The input optical pulse b that has passed through the object 45 to be measured is input to an analyzer 69 as an output optical pulse d.

In this case, light which is input to the analyzer 69 may be converted into linearly polarized light depending on the polarization state of the input optical pulse b and the polarization characteristics of the object 45 to be measured. To avoid such conversion, a polarization controller (not shown) may be interposed in the optical path between the optical power divider 44 and the object 45 to be measured.

The analyzer 69 passes only a light component in a direction α of polarization set by the controller 43a of the output optical pulse d that has passed through the object 45 to be measured.

An output optical pulse q that has passed through the analyzer 69 is launched into one terminal of the polarization splitter 47 in the next sampling unit 46.

The other terminal of the polarization splitter 47 in the next sampling unit 46 receives reference optical pulses e which are output from the optical delay device 48 and having delay times that increase in increments of ΔT.

The sampling unit 46 sequentially outputs autocorrelation intensity signals g corresponding to the light intensities at the respective positions of the waveform of the output optical pulse q as in the wavelength dispersion measurement apparatus of the first embodiment.

The signal processor 53 generates an autocorrelation waveform $g_1$ corresponding to the signal waveform of the output optical pulse q using those autocorrelation intensity signals g.

The controller 43a calculates a delay time $t_D$ of the output optical pulse d from the reference optical pulse c on the basis of the delay time (delay amount) of the reference optical pulse e corresponding to the peak value of the autocorrelation waveform $g_1$.

In this way, the delay time $t_D$ of the output optical pulse q in one direction α of polarization is obtained. The controller 43a then sets the direction α of polarization of the analyzer 69 in another direction, and calculates a delay time $t_D$ corresponding to the new direction α of polarization.

As described above, in the polarization dispersion measurement apparatus of the sixth embodiment, delay times $t_D$ upon changing the direction α of polarization from 0 to $2\pi$ are calculated, and the dependence characteristics of the delay times $t_D$ on the directions α of polarization are determined as the polarization dispersion characteristics of the object 45 to be measured comprising an optical fiber.

In the polarization dispersion measurement apparatus of the sixth embodiment having the above arrangement as well, the optical pulse a having the predetermined repetition period T is used as measurement light, and the delay amount of each reference optical pulse e is set with high precision using the optical delay device 48.

Therefore, in the polarization dispersion measurement apparatus of the sixth embodiment, the delay time $t_D$ of the output pulse q from the reference optical pulse c can be measured with high precision as in the wavelength dispersion measurement apparatus of the first embodiment.

Hence, in the polarization dispersion measurement apparatus of the sixth embodiment as well, even when the object 45 to be measured is a long optical fiber having a length of 20 m, 50 m, or the like, a delay time detection apparatus for an optical element that can greatly improve the measurement precision of the polarization dispersion characteristics can be realized.

To restate, in the wavelength and polarization dispersion measurement apparatuses of the present invention, an optical pulse having a predetermined repetition period is used as input light to be input to the object to be measured and reference light in place of continuous light, and the delay amount of a reference optical pulse is set with high precision using a spatial optical delay means.

According to the wavelength and polarization dispersion measurement apparatuses of the present invention, an interference point can be easily detected, the wavelength dispersion of even an elongated object to be measured can be measured with high precision without using the absolute delay amount of output light which is output from the object to be measured, and the wavelength and polarization dispersions can be measured with high precision over a broad length range from several meters to several ten m.

In sum, the present invention can provide a delay time measurement apparatus for an optical element, including a wavelength dispersion measurement apparatus which can measure the wavelength dispersion of even a long object to be measured with high precision using pulse light as input light to be input to the object to be measured and reference light in place of continuous light without being influenced by the absolute delay amount produced by the physical length of an optical element such as an optical fiber or the like as the object to be measured, and can measure wavelength dispersion with high precision over a broad length range from several meters to several ten meters, and a polarization dispersion measurement apparatus which can measure the polarization dispersion of a low-dispersion object to be measured with high precision using the same method as that of the wavelength dispersion measurement apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A delay time measurement apparatus for an optical element, comprising:

a pulse light source which can vary a wavelength of light to be output, and outputs an optical pulse having a predetermined repetition period (T);

wavelength setting means for setting the wavelength of the light to be output from said pulse light source;

an optical power divider for dividing the optical pulse output from said pulse light source into a first optical pulse and a second optical pulse, the second optical pulse being input to an optical element as an object to be measured;

optical delay means for changing a spatial optical path length along which the first optical pulse divided by said optical power divider travels, wherein the optical delay means receives the first optical pulse and outputs a reference optical pulse after a predetermined delay corresponding to the spatial optical path length of the optical delay means;

control means for changing the spatial optical path length of said optical delay means, wherein the control means includes a spatial optical delay element controller which is adapted to control the spatial optical path length of the of the optical delay means and is adapted to arbitrarily set a relative delay amount of the reference optical pulse with respect to an output optical pulse which has passed through the object to be measured by changing the spatial optical path length in the spatial optical delay element controller and thereby changing an optical path length through which the first optical pulse passes; and a detector comprising:

sampling means for receiving the output optical pulse that has passed through the object to be measured and the reference optical pulse delayed by said optical delay means, and for obtaining an autocorrelation intensity signal proportional to a light intensity of the output optical pulse at a given position every time said optical delay means changes the relative delay amount of the reference optical pulse; and signal processing means for obtaining an autocorrelation waveform of the output optical pulse from the autocorrelation intensity signals sequentially obtained by said sampling means;

wherein the signal processing means includes means for outputting an optical delay element drive signal to the spatial optical delay element controller for sequentially changing the spatial optical path length of the optical delay means by a predetermined small distance $\Delta L$, where $\Delta L$ corresponds to an increment $\Delta T$ of delay time, and where $\Delta T \ll T$, to a maximum path length change corresponding to the period T, to match respective phases of the reference optical pulse and the output optical pulse and maximize of the autocorrelation intensity signal; and wherein said detector detects a delay time of light that has passed through the optical element as the object to be measured based on the relative delay amount of the reference optical pulse delayed by said optical delays means, said delay time being required for obtaining a peak of the obtained autocorrelation waveform of the output optical pulse.

2. A delay time measurement apparatus for an optical element, comprising:

a pulse light source which can vary a wavelength of light to be output, and outputs an optical pulse having a predetermined repetition period (T);

wavelength setting means for setting the wavelength of the light to be output from said pulse light source;

an optical power divider for dividing the optical pulse output from said pulse light source into a first optical pulse and a second optical pulse, the second optical pulse being input to an optical element as an object to be measured;

optical delay means for changing a spatial optical path length along which the first optical pulse divided by said optical power divider travels, wherein the optical delay means receives the first optical pulse and outputs a reference optical pulse after a predetermined delay corresponding to the spatial optical path length of the optical delay means;

control means for changing the spatial optical path length of said optical delay means, wherein the control means includes a spatial optical delay element controller which is adapted to control the spatial optical path length of the of the optical delay means and is adapted to arbitrarily set a relative delay amount of the reference optical pulse with respect to an output optical pulse which has passed through the object to be measured by changing the spatial optical path length in the spatial optical delay element controller and thereby changing an optical path length through which the first optical pulse passes; and a detector comprising:

sampling means for receiving the output optical pulse that has passed through the object to be measured and the reference optical pulse delayed by said optical delay means, and for obtaining an autocorrelation intensity signal proportional to a light intensity of the output optical pulse at a given position every time said optical delay means changes the relative delay amount of the reference optical pulse; and signal processing means for obtaining an autocorrelation waveform of the output optical pulse from the autocorrelation intensity signals sequentially obtained by said sampling means, wherein the signal processing means includes means for outputting an optical delay element drive signal to the spatial optical delay element controller for sequentially changing the spatial optical path length of the optical delay means by a predetermined small distance $\Delta L$, where $\Delta L$ corresponds to an increment ΔT of delay time, and where ΔT<<T, to a maximum path length change corresponding to the period T, to match respective chases of the reference optical pulse and the output optical pulse and maximize of the autocorrelation intensity signal; and wherein said detector obtains a wavelength dispersion of the object to be measured based on the relative delay amount of the reference optical pulse delayed by said optical delay means, said wavelength dispersion being required for obtaining a peak of the obtained autocorrelation waveform of the output optical pulse.

3. An apparatus according to claim 2, wherein said sampling means comprises:

a polarization splitter for splitting each of the output and reference optical pulses into two light components having 90° different planes of polarization, combining two pairs of output and reference optical pulses which have been split and have 90° different planes of polarization, and outputting the combined pulses onto different optical paths;

a pair of nonlinear optical materials which generate autocorrelation signals of the output and reference optical pulses which have 90° different planes of polarization as SHG (Second Harmonic Generator) light components, and can attain type 2 phase matching;

a pair of photosensors for converting the SHG light components output from said nonlinear optical materials into electrical signals; and an adder circuit for adding the electrical signals output from the photosensors, and outputting the sum electrical signal as an autocorrelation intensity signal.

4. An apparatus according to claim 2, wherein said sampling means comprises:

a optical power coupler for combining the output and reference optical pulses to have 90° different planes of polarization;

a nonlinear optical material which generates an autocorrelation signal between the output and reference optical pulses, which are output from said optical power coupler and have 90° different planes of polarization, as SHG light, and can attain type 2 phase matching; and a photosensor for converting the SHG light into an electrical signal, and outputting the electrical signal as an autocorrelation intensity signal.

5. An apparatus according to claim 2, wherein said sampling means comprises:

a pair of polarization controllers which are inserted in optical axes of the output and reference optical pulses, and make planes of polarization of the output and reference optical pulses parallel to each other;

a lens which is inserted in the optical axes of the output and reference optical pulses that have passed through said pair of polarization controllers, and focuses the output and reference optical pulses to an identical point;

a nonlinear optical material which is located on a focal point of said lens, generates an autocorrelation signal of the output and reference optical pulses as SHG light, and can attain type 1 phase matching;

a slit member for separating the SHG light generated by said nonlinear optical element from the output and reference optical pulses; and a photosensor for converting the SHG light separated by said slit into an electrical signal, and outputting the electrical signal as an autocorrelation intensity signal.

6. A delay time measurement apparatus for an optical element comprising:

a pulse light source which can vary a wavelength of light to be output, and outputs an optical pulse having a predetermined repetition period (T);

wavelength setting means for setting the wavelength of the light to be output from said pulse light source;

an optical power divider for dividing the optical pulse output from said pulse light source into a first optical pulses, a second optical pulse, and a bypass reference pulse, the second optical pulse being input to an optical element as an object to be measured;

optical delay means for changing a spatial optical path length along which the first optical pulse divided by said optical power divider travels, wherein the optical delay means receives the first optical pulse and outputs a reference optical pulse after a predetermined delay corresponding to the spatial optical path length of the optical delay means;

control means for changing the spatial optical path length of said optical delay means, wherein the control means includes a spatial optical delay element controller which is adapted to control the spatial optical path length of the of the optical delay means and is adapted to arbitrarily set a relative delay amount of the reference optical pulse with respect to an output optical pulse which has passed through the object to be measured by changing the spatial optical path length in the spatial optical delay element controller and thereby changing an optical path length through which the first optical pulse passes; and a detector which receives the optical pulse output from the optical element as the subject to be measured and the reference optical pulse output from said optical delay means, and detects a delay time of light that has passed through the optical element as the object to be measured from a change in the spatial optical path length, said delay time being required for superposing the output and reference optical pulses on each other;

wherein said apparatus further comprises an optical power coupler for combining the output optical pulse that has passed through the object to be measured and the bypass reference optical pulse, and outputting the pulses as combined light, wherein said detector comprises:

sampling means for receiving the combined light output from said optical power coupler and the reference optical pulse delayed by said optical delay means, and for obtaining an autocorrelation intensity signal proportional to a light intensity of the combined light at a given position every time said optical delay means changes a relative delay amount of the reference optical pulse; and signal processing means for obtaining an autocorrelation waveform of the combined light from the autocorrelation intensity signals sequentially obtained by said sampling means, wherein the signal processing means includes means for outputting an optical delay element drive signal to the spatial optical delay element controller for sequentially changing the spatial optical path length of the optical delay means by a predetermined small distance ΔL, where ΔL corresponds to an increment ΔT of delay time, and where ΔT<<T, to a maximum path length change corresponding to the period T, to match respective phases of the reference optical pulse and the output optical pulse and maximize of the autocorrelation intensity signal; and wherein said detector obtains a wavelength dispersion of the object to be measured based on a spacing between peaks of the bypass reference optical pulse and the output optical pulse contained in the obtained autocorrelation waveform of the combined light.

7. An apparatus according to claim 1, wherein said pulse light source comprises:

a white pulse light source for outputting a white optical pulse which has a predetermined repetition period and a broad wavelength range; and a spectroscope for extracting and outputting an optical pulse having a designated single wavelength from the white optical pulse output from said white pulse light source.

8. A delay time measurement apparatus for an optical element, comprising:

a pulse light source which can vary a wavelength of light to be output, and outputs an optical pulse having a predetermined repetition period (T);

wavelength setting means for setting the wavelength of the light to be output from said pulse light source;

an optical power divider for dividing the optical pulse output from said pulse light source into a first optical pulse and a second optical pulse, the second optical pulse being input to an optical element as an object to be measured;

optical delay means for changing a spatial optical path length along which the first optical pulse divided by said optical power divider travels, wherein the optical delay means receives the first optical pulse and outputs a reference optical pulse after a predetermined delay corresponding to the spatial optical path length of the optical delay means;

control means for changing the spatial optical path length of said optical delay means, wherein the control means includes a spatial optical delay element controller which is adapted to control the spatial optical path length of the of the optical delay means and is adapted to arbitrarily set a relative delay amount of the reference optical pulse with respect to an output optical pulse which has passed through the object to be measured by changing the spatial optical path length in the spatial optical delay element controller and thereby changing an optical path length through which the first optical pulse passes;

an analyzer for passing a component in a specific direction of polarization in the output optical pulse that has passed through the object to be measured; and a detector comprising:

sampling means for receiving the output optical pulse that has passed through said analyzer and the reference optical pulse delayed by said optical delay means, and for obtaining an autocorrelation intensity signal proportional to a light intensity of the output optical pulse at a given position every time said optical delay means changes a relative delay amount of the reference optical pulse; and signal processing means for obtaining an autocorrelation waveform of the output optical pulse from the autocorrelation intensity signals sequentially obtained by said sampling means, wherein the signal processing means includes means for outputting an optical delay element drive signal to the spatial optical delay element controller for sequentially changing the spatial optical path length of the optical delay means by a predetermined small distance $\Delta L$, where $\Delta L$ corresponds to an increment $\Delta T$ of delay time, and where $\Delta T \ll T$, to a maximum path length change corresponding to the period T, to match respective phases of the reference optical pulse and the output optical pulse and maximize of the autocorrelation intensity signal; and wherein said detector obtains a polarization dispersion of the object to be measured based on the relative delay amount of the reference optical pulse delayed by said optical delay means, said polarization dispersion being required for obtaining a peak of the obtained autocorrelation waveform of the output optical pulse.

9. An apparatus according to claim 2, wherein said pulse light source comprises:

a white pulse light source for outputting a white optical pulse which has a predetermined repetition period and broad wavelength range; and a spectroscope for extracting and outputting an optical pulse having a designated single wavelength from the white optical pulse output from said white pulse light source.

10. An apparatus according to claim 6, wherein said pulse light source comprises:

a white pulse light source for outputting a white optical pulse which has a predetermined repetition period and a broad wavelength range; and a spectroscope for extracting and outputting an optical pulse having a designated single wavelength from the white optical pulse output from said white pulse light source.

11. An apparatus according to claim 8, wherein said pulse light source comprises:

a white pulse light source for outputting a white optical pulse which has a predetermined repetition period and a broad wavelength range; and a spectroscope for extracting and outputting an optical pulse having a designated single wavelength from the white optical pulse output from said white pulse light source.

* * * * *